(12) United States Patent
Marin et al.

(10) Patent No.: US 6,619,041 B2
(45) Date of Patent: Sep. 16, 2003

(54) STEAM GENERATION APPARATUS AND METHODS

(75) Inventors: Ovidiu Marin, Lisle, IL (US); Olivier Charon, Chicago, IL (US); Erwin Penfornis, Oak Park, IL (US)

(73) Assignees: L'Air Liquide - Societe Anonyme a Directoire et Conseil de Surveillance pour l'Etude et l'Exploitation des Procedes Georges Claude, Paris (FR); American Air Liquide, Fremont, CA (US)

( * ) Notice: Subject to any disclaimer, the term of this patent is extended or adjusted under 35 U.S.C. 154(b) by 0 days.

(21) Appl. No.: 10/106,547

(22) Filed: Mar. 26, 2002

(65) Prior Publication Data

US 2003/0101726 A1 Jun. 5, 2003

Related U.S. Application Data

(60) Provisional application No. 60/302,242, filed on Jun. 29, 2001, and provisional application No. 60/339,515, filed on Oct. 26, 2001.

(51) Int. Cl.[7] ................................................ F01K 7/34
(52) U.S. Cl. ........................................ 60/653; 60/679
(58) Field of Search .......................... 60/653, 670, 679

(56) References Cited

U.S. PATENT DOCUMENTS

| | | | |
|---|---|---|---|
| 3,628,332 A | | 12/1971 | Kelmar |
| 4,099,382 A | | 7/1978 | Paull et al. |
| 4,116,005 A | | 9/1978 | Willyoung |
| 4,382,366 A | | 5/1983 | Gaumer |
| 4,545,976 A | * | 10/1985 | Osman .................. 423/650 |
| 4,910,963 A | | 3/1990 | Vanzo |
| 5,027,720 A | | 7/1991 | Merritt et al. |
| 5,038,568 A | * | 8/1991 | Gounder et al. .......... 60/679 |
| 5,040,370 A | | 8/1991 | Rathbone |
| 5,067,837 A | | 11/1991 | Panopoulos |
| 5,129,331 A | | 7/1992 | Merritt et al. |
| 5,247,907 A | * | 9/1993 | Lee et al. ............... 122/1 R |
| 5,265,424 A | | 11/1993 | Merritt |
| 5,388,395 A | | 2/1995 | Scharpf et al. |

(List continued on next page.)

FOREIGN PATENT DOCUMENTS

| | | |
|---|---|---|
| EP | 1 172 135 A1 | 1/2002 |
| JP | 2001 41402 | 2/2001 |
| JP | 2001 56104 | 2/2001 |

OTHER PUBLICATIONS

Babcock & Wilcox, Steam, Its Generation and Use, 1978, pp 34–10 to 34–25, 39th Edition.

Yantovskii, E.I., The Themodynamics of Fuel–Fired Power Plants Without Exhaust Gases, World Clean Energy Conference, Geneva, Nov. 1991, Institute for Energy Research, U.S.S.R. Academy of Sciences, Moscow, U.S.S.R.

Mathieu, Ph., and Nihart, R., Sensitivity Analysis of the Matiant Cycle, pp. 775–787, University of Liege, Institut de Mecanique, Belgium.

*Primary Examiner*—Hoang Nguyen
(74) *Attorney, Agent, or Firm*—Linda K. Russell; Christopher J. Cronin

(57) ABSTRACT

Steam generation apparatus and methods are presented that are dedicated to oxygen-enriched air combustion of a fuel, wherein the oxygen concentration of the oxygen-enriched air may range from just above 21 percent to 100 percent. One apparatus comprises an oxygen-enriched air preheater through which oxygen-enriched air flows and exchanges heat indirectly with flue gas, creating a preheated oxygen-enriched air stream. The apparatus further comprises a boiler having a radiant section and a convection section, and other heat transfer units adapted to handle reduced flue gas flow rate and higher temperature flue gases than comparable air/fuel combustion boilers, thus allowing a smaller heat transfer surface area, a more compact design and a higher efficiency.

20 Claims, 11 Drawing Sheets

U.S. PATENT DOCUMENTS

| | | |
|---|---|---|
| 5,406,786 A | 4/1995 | Scharpf et al. |
| 5,657,624 A | 8/1997 | Kang et al. |
| 5,680,764 A | 10/1997 | Viteri |
| 5,701,850 A * | 12/1997 | Kohler et al. .......... 122/235.23 |
| 5,709,077 A | 1/1998 | Beichel |
| 5,715,673 A | 2/1998 | Beichel |
| 5,937,652 A | 8/1999 | Abdelmalek |
| 5,956,937 A | 9/1999 | Beichel |
| 5,970,702 A | 10/1999 | Beichel |
| 6,035,642 A * | 3/2000 | Peletz et al. .................. 60/649 |
| 6,047,547 A | 4/2000 | Heaf |
| 6,071,116 A | 6/2000 | Philippe et al. |
| 6,105,369 A * | 8/2000 | Peletz, Jr. .................... 60/649 |
| 6,113,389 A | 9/2000 | Joshi et al. |
| 6,170,264 B1 | 1/2001 | Viteri et al. |
| 6,247,315 B1 | 6/2001 | Marin et al. |
| 6,250,916 B1 | 6/2001 | Philippe et al. |
| 6,256,994 B1 | 7/2001 | Dillon, IV |
| 6,263,659 B1 | 7/2001 | Dillon, IV et al. |
| 6,264,466 B1 | 7/2001 | Joshi et al. |
| 6,273,180 B1 | 8/2001 | Joshi et al. |
| 6,276,928 B1 | 8/2001 | Johsi et al. |
| 6,282,901 B1 | 9/2001 | Marin et al. |
| 6,314,896 B1 | 11/2001 | Marin et al. |

* cited by examiner

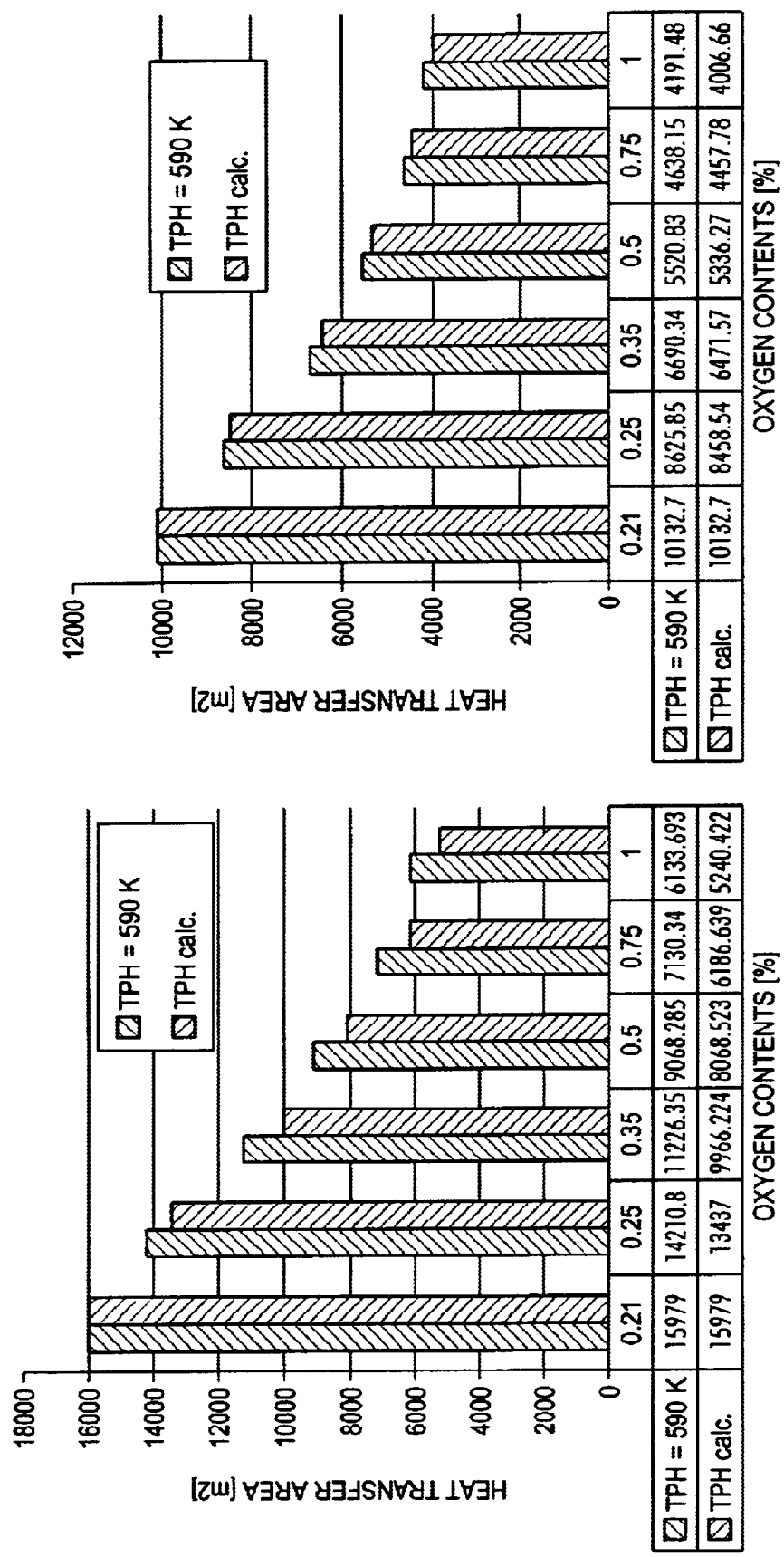

STEAM GENERATION APPARATUS AND METHODS

CROSS-REFERENCE TO RELATED APPLICATIONS

The present application is related to and claims priority from provisional patent application serial Nos. 60/302,242, filed Jun. 29, 2001, and 60/339,515, filed Oct. 26, 2001, both of which are incorporated herein by reference.

BACKGROUND OF THE INVENTION

1. Field of the Invention

This invention concerns oxygen enriched air/fuel combustion steam generation apparatus and methods, more especially in terms of reduced heat transfer surface areas as the percentage of oxygen in the combustion air is increased to 100 percent. In this way a new design of steam generation apparatus is promoted, characterized both by lower investment costs and operating costs.

2. Related Art

The steam generation research and development community faces an important challenge in the years to come: to produce increased amounts of energy under the more and more stringent constraints of increased efficiency and reduced pollution. In order to fulfil both of these requirements, oxygen-enriched air/fuel combustion appears like an attractive candidate, since it has already proven to lead to significant process improvements in other industrial applications, such as fuel savings, production increase or reduced emissions.

U.S. Pat. Nos. 6,282,901 and 6,314,896 disclose methods of oxygen enrichment in existing air/fuel combustion steam generation apparatus, involving a certain ratio between the oxygen enrichment and the flue gas recirculation, such that the heat transfer patterns are maintained relatively unchanged. The purpose of the present invention is quite different, since the present invention aims at creating a new design of steam generation apparatus, specially adapted for oxygen-enriched air/fuel combustion, preferably with oxygen enrichment higher than 90%. As used herein the term "boiler" will be used to denote generic steam generation apparatus, which includes boilers producing steam for power generation through turbines, as well as steam generation for other uses. U.S. Pat. No. 5,265,424 discloses and advanced furnace boiler system using oxygen as the oxidant. However, the patent fails to teach how to calculate heat transfer areas for the various heat transfer surfaces, and thus does not even mention or recognize the reduction in heat transfer surface areas possible using oxygen-enriched air, or industrially pure oxygen.

Oxygen-enriched combustion (OEC) has become a popular technique employed in a series of industrial applications, such as glass, steel, aluminum and cement manufacturing, to name only a few. The employment of the oxygen-enriched technique has proven to lead to significant process improvements in these industries, such as fuel savings, production increase, waste processing, and the like. Presently, there are applications where the employment of oxygen enriched-combustion has not yet started to be applied on a large scale. One of these applications is boilers, where very large amounts of fuel are used for combustion purposes.

Existing steam generation apparatus have widely ranging steam outputs, requiring an energy input from a few hundred kW to thousands of MW. However, the very large investment required for a new boiler, together with the already high thermodynamic efficiency of existing boilers make the introduction of operational changes relatively difficult to implement. The boiler operators are reluctant to introduce modifications in the boiler characteristics, due to possible changes in water vapor properties (temperature, humidity, and the like). Different heat transfer patterns in the various areas of the boiler (combustion space, convective regions) will lead to different local vaporization/superheating rates of the steam, with direct impact on the boiler tubes. Local vapor superheating may lead to lower heat transfer coefficients, therefore to local boiler tube overheating, eventually causing cracks in boiler tubes. It is therefore crucial, when retrofitting an existing air/fuel combustion boiler to combust oxygen-enriched air with fuel, to maintain relatively unchanged the heat transfer patterns as originally designed, in order to produce safely the designed vapor throughput.

Basically, the use of oxygen-enriched combustion has two consequences to the oiler: it reduces the mass fraction of nitrogen, and it increases the adiabatic temperature of the flame. It is thus clear that the oxygen-enriched combustion can dramatically affect the heat transfer patterns in a system characterized by both radiative and convective heat transfers. While the increased flame temperature has a beneficial role on the radiative heat transfer, the diminished flow rates and temperature levels in the convective part of the installation may lead to lower heat transfer rates in this region. This means that for systems where the radiative heat transfer is the main heat transfer mechanism, such as cement kilns or glass furnaces, the oxygen enrichment can be used as such, without further modifications. However, for systems where convective heat transfer is important, changes to the installations have to be performed, in order to maintain the design parameters of the system unchanged, without modifying the heat exchanger structure.

Several inventions have already dealt with oxygen enrichment in steam generating boiler operation, promoting different methods to retrofit existing installations. The oxygen boosting can actually be used in connection with:

Increase of production (steam throughput), with the same boiler design;

Redesign of the convective part, to ensure the same production;

Fuel staging, allowing gas temperature and mass flow rate increase, in order to maintain the same convective heat transfer as in the initial design.

Flue Gas Recirculation, to maintain general heat transfer patterns essentially the same as the air-based combustion.

None of these solutions have been readily accepted in the art, for one or more reasons. Therefore, there exists a need in the art for a new boiler design to apply oxygen-enriched combustion in steam generators. There is especially needed designs which allow taking advantage of the usual benefits of oxygen-enriched air/fuel combustion, while avoiding the above risks and constraints linked to the retrofit of existing boilers.

SUMMARY OF THE INVENTION

In accordance with the present invention, steam generation apparatus and methods are presented which overcome many, if not all of the above shortcomings of previously known systems.

A first aspect of the invention is a steam generation apparatus dedicated to combustion of a fuel with an oxygen-enriched oxidant, wherein the oxygen concentration of the oxidant may range from just above 21 percent to 100 percent, the apparatus comprising:

a) an oxidant preheater for exchanging heat with a flue gas, the preheater having a geometry, a size and a heat transfer area to take advantage of i) a flue gas flow rate that is lower, and ii) a flue gas temperature that is higher, due to oxidant/fuel combustion, than a comparable power air/fuel combustion boiler base case;

b) means for introducing a fuel and the oxidant into a combustion space within the furnace of the boiler and combusting the fuel in the presence of the oxidant in order to generate the flue gas;

c) the furnace having a radiant heat transfer section with a plurality of radiant heat transfer section tubes, said tubes having reduced heat transfer area compared to the base case (preferably resulting in less heat loss and higher efficiency than the base case); and d) a convection heat transfer section having a plurality of convection heat transfer section tubes positioned so as to afford increased heat transfer between the flue gas and boiler feed water traversing therethrough while using less heat transfer area over the base case of air/fuel combustion.

More precisely, the steam generation systems of the invention are based on oxidants selected from the group consisting of oxygen-enriched air and oxygen, and are preferably characterized by reduced heat transfer areas, and preferably include in their basic configuration the same major components as in air/fuel combustion steam boilers, namely:

one or more oxidant preheaters through which oxidant flows and exchanges heat indirectly with flue gas, the flue gas having a first flue gas temperature, and creating a preheated oxidant stream which flows through a first conduit to the furnace of the boiler and a flue gas stream having a second flue gas temperature which is lower than the first flue gas temperature, the one or more preheaters adapted to be compatible with heated oxidant having an oxygen concentration ranging from just above 21 percent to about 100 percent;

a second conduit connecting a fuel source and the furnace of the boiler;

a boiler having a radiant section adapted to accept oxidant having an oxygen concentration ranging from just above 21 percent to about 100 percent, the radiant section having a plurality of radiant section tubes, and a convection section adapted to accept flue gases from combustion of a fuel and the oxidant, the convection section having a plurality of convection section tubes, each one of the plurality of radiant section tubes connected to one of the plurality of convection section tubes, the flue gases flowing eventually to the one or more oxidant preheaters through a third conduit;

a source of boiler feed water connected to the plurality of convection section tubes by a fourth conduit, the fourth conduit including an economizer that allows heat transfer between the flue gas at a third flue gas temperature, the third flue gas temperature higher than the first flue gas temperature, and the boiler feed water; and a fifth conduit connected outside of the boiler enclosure to the plurality of convection or radiant section tubes and routing the steam flow to means for reducing pressure selected from the group consisting of control valves and turbines.

Preferred apparatus of the invention are those including at least one superheater, the superheater connected to at least a portion of the plurality of convection section tubes, thus allowing heat exchange between flue gas at a fourth flue gas temperature, the fourth flue gas temperature being greater than the third flue gas temperature, and steam flowing through the superheater; apparatus including a steam drum, the steam drum connected to at least a portion of the plurality of radiant and convection section tubes; and apparatus including an attemperator, the attemperator connected to the superheater.

Other preferred apparatus in accordance with this aspect of the invention are those wherein the oxidant preheater is selected from the group consisting of tubular, flat plate (recuperative), and regenerative heat exchangers, among others.

Yet other preferred apparatus are those wherein the boiler is a supercritical pressure boiler, apparatus wherein the boiler is a subcritical pressure boiler, and apparatus wherein water circulation in a subcritical pressure boiler is produced by a mechanism selected from the group consisting of gravity circulation, forced circulation, and combinations thereof.

Other preferred apparatus include a first expansion turbine for producing electricity from a first high pressure fluid flowing from the superheater, the first expansion turbine producing a low pressure fluid which is routed to a reheater, the reheater allowing heat exchange between flue gas at a fifth flue gas temperature, the fifth flue gas temperature greater than the fourth flue gas temperature, and the low pressure fluid flowing through the reheater, thus creating a second low pressure, reheated fluid which is subsequently routed to a second expansion turbine. Multiple turbines and associated reheaters are envisioned to be within the invention.

A second aspect of the invention is a method of operating the steam generation apparatus of the first aspect of the invention having reduced heat transfer area and increased efficiency for a power production equivalent to an air/fuel combustion base case, the methods comprising the steps of:

a) flowing the oxidant through the oxidant preheater and exchanging heat indirectly with the flue gas exiting the boiler, thus forming a preheated oxidant, the oxidant selected from the group consisting of oxygen-enriched air and oxygen;

b) introducing the fuel and the preheated oxidant into the furnace of the boiler and combusting the fuel with the preheated oxidant to generate the flue gas and thermal energy, the flue gas having a flow rate that is reduced compared to the base case; and c) feeding the boiler with boiler feed water and circulating the water through the plurality of convection heat transfer section tubes and the plurality of radiant heat transfer section tubes, in order to preheat and evaporate the water, and produce superheated steam by heat transfer between the flue gas and the boiler feed water.

Further aspects and advantages of the invention will become apparent by reviewing the description of preferred embodiments that follow.

BRIEF DESCRIPTION OF THE DRAWINGS

FIGS. 10, 11 and 12 are bar graphs representing the reduction in area of heat transfer surfaces resulting from practice of the boiler of FIGS. 1 and 9.

DESCRIPTION OF PREFERRED EMBODIMENTS

Figure 1:
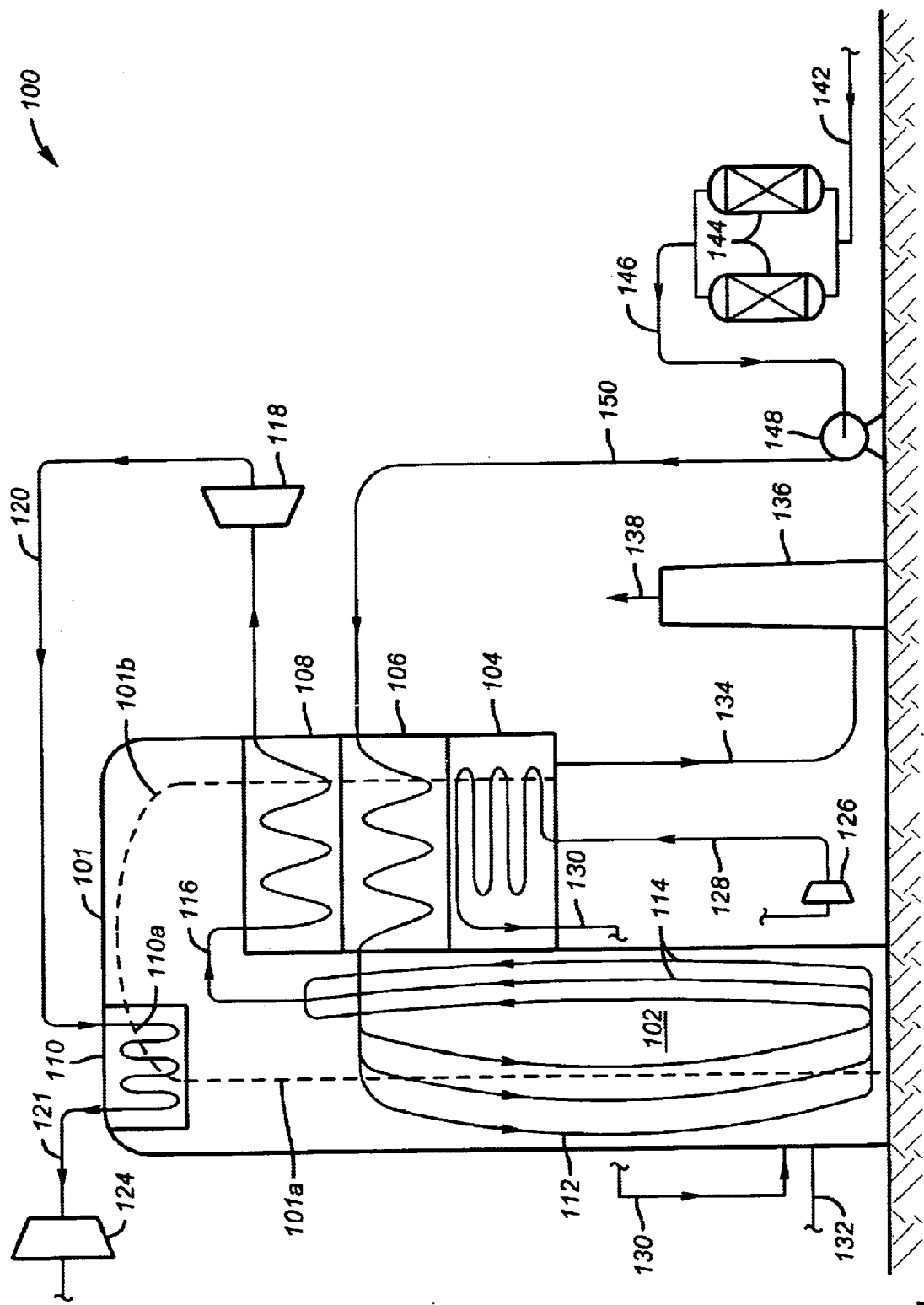
FIGS. 1, 2, 3, 4, 5, 6, 7, and 8 are schematic process flow, side elevation views of eight boiler embodiments of the invention.

Referring now to the drawing figures, which are not necessarily drawn to scale as the boilers would be constructed, FIGS. 1–8 illustrate eight different configurations of various heat exchange surfaces useful in constructing the boilers of the invention. It should be noted that the term "boiler" is synonymous with the phrase "steam generator", and both are intended to denote the entire heat transfer apparatus. The oxidant is referred to as oxygen-enriched air for convenience, it being understood that the oxidant could be oxygen, or a mixture of oxygen with other components, as long as the oxygen concentration is above the concentration of oxygen in the local air atmosphere. FIG. 1 illustrates a schematic process, side elevation view of a first boiler embodiment of the invention. This embodiment, designated 100 in FIG. 1, comprises as major components a boiler 101, a furnace 102, an oxygen-enriched air preheater 104, an economizer 106, a superheater 108, and a radiant reheater 110. Also illustrated in FIG. 1 are a plurality of downcomer furnace tubes indicated at 112, and a plurality of riser tubes 114, which meet at a header 116. Downcomer tubes and riser tubes useful in all embodiments may be selected from straight tubes and bent tubes, with bent tubes being preferred due to their being more economical and their serviceability. Header 116 is preferably simply an elongated tube which passes steam through to superheater 108, thereby allowing steam to indirectly exchange heat with furnace flue gases. A first turbine 118 accepts superheated, preferably supercritical pressure steam from header 116, and exhausts into conduit 120. Conduit 120 routes reduced pressure steam exhausted from first turbine 118 into radiant reheater 110, where hot flue gases in furnace 102 exchange heat with turbine exhaust traversing through conduit 120. Reheated steam exits reheater 110 through a conduit 121 and is preferably routed to a second turbine 124.

Oxygen-enriched air is compressed or blown by a compressor/blower 126 through a conduit 128, which allows the oxygen-enriched air to pass through preheater 104 and then through conduit 130 into furnace 102, through one or more burners. Different configurations of oxidant injection in the furnace are possible, using primary, secondary and overfire inlets, but those are not the subject of the invention. Fuel enters furnace 102 through one or more conduits 132 and is routed to one or more burners. Flue gases exit boiler 101 after traversing through superheater 108, economizer 106, and preheater 104, respectively, and exit through conduit 134, to a stack 136 and ultimately to atmosphere at 138. (Suitable emission control equipment, such as an electrostatic precipitator, is not illustrated in any embodiment. Their use may be required depending on the fuel combusted and local laws and regulations.) Raw water enters the boiler at 142 and enters a series of treatment units, here designated generically at 144. Those possessed of ordinary skill in the boiler art will recognize that the treatment of raw water to form boiler feedwater is a complicated process involving many steps. As illustrated in FIGS. 1–8, the unit operations employed to create boiler feedwater from raw water are generically represented by units 144, with the understanding that production of boiler feedwater would typically involve a plurality of steps selected from the group consisting of deaeration, ion exchange, preferably with resins, filtration, chemical treatment, chelate treatment, and combinations thereof, and other treatments known to those of ordinary skill in the boiler art. See for example the discussion in "Steam, Its Generation and Use", Babcock & Wilcox, 39$^{th}$ Edition (1978), pages 34–10 to 34–25, incorporated herein by reference for its teaching of boiler feedwater treatment techniques. Treated boiler feedwater exits treatment units 144 through a conduit 146 and enters a suction of a boiler feedwater pump 148. Boiler feedwater pump 148 pumps boiler feedwater through a discharge conduit 150 and into economizer 106 and eventually into downcomer furnace tubes 112. Since the boiler feedwater entering through conduit 150 is colder than boiler feedwater/steam in riser tubes 114, there is a natural tendency for the colder water in downcomer tubes 112 to push the warmer fluid in riser tubes 114 toward header 116.

Figure 9:
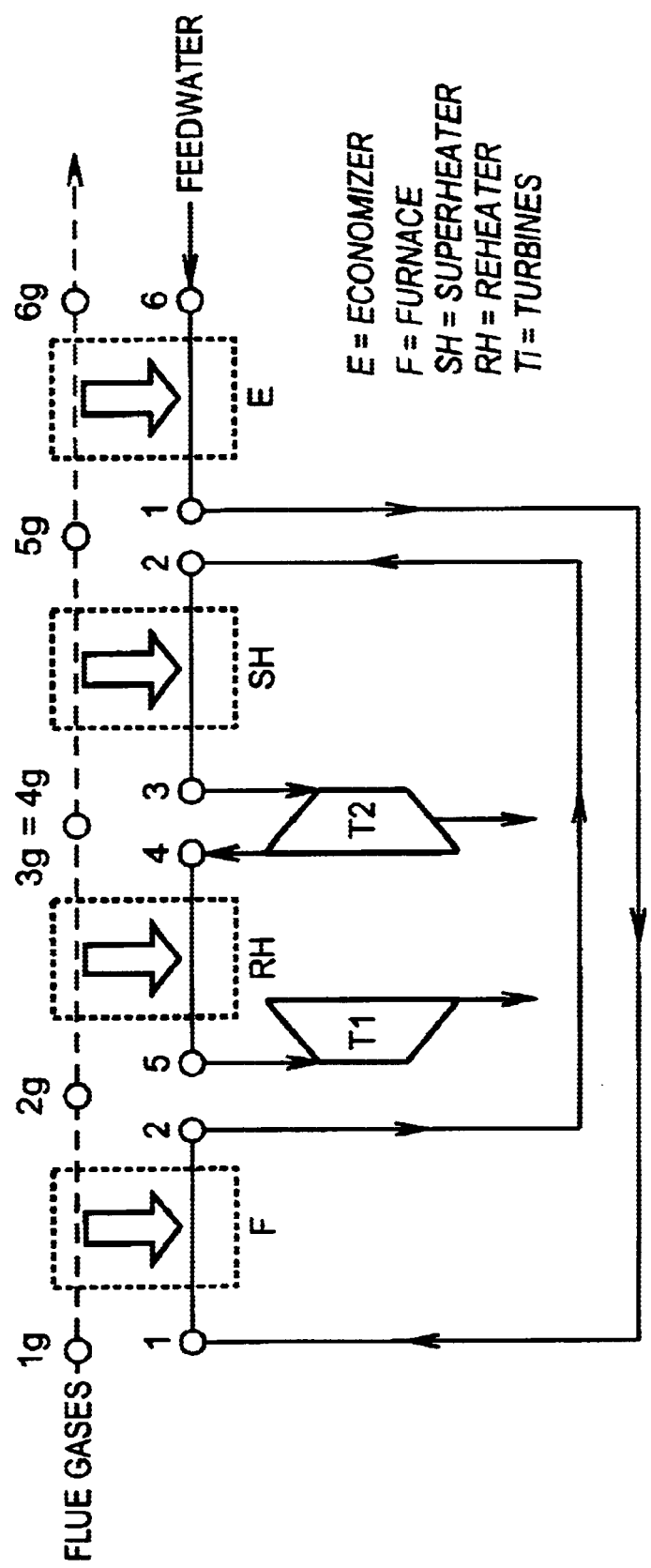
FIG. 9 is a schematic process flow diagram of the embodiment of FIG. 1.

The embodiment of FIGS. 1 and 9 is an example of a SCRRP (supercritical, radiant, reheat and pressurized) boiler, and is analyzed in combustion calculations in the Example section. As will become apparent in the Example, the heat exchange areas for furnace 102, reheater 110, superheater 108, economizer 106, and preheater 104 are all smaller than a comparable power air/fuel boiler. This is illustrated by the phantom dotted lines 101a, 101b, and 110a in FIG. 1. In other words, an air/fuel boiler 101 would have dimensions indicated at 101, while a boiler of the invention would have a radiant section of furnace as depicted (for example) by phantom line 101 a and a convection section as indicated by phantom line 101b; air/fuel reheater 110 would be larger in heat transfer area than reheater 110a, and so on for superheater 108, economizer 106, and preheater 104. As there is less flue gas flowing through conduit 134 and out stack 136 for a boiler of the invention compared with an equivalent power air/fuel boiler, savings may also be seen in duct work capital costs.

Figure 2:
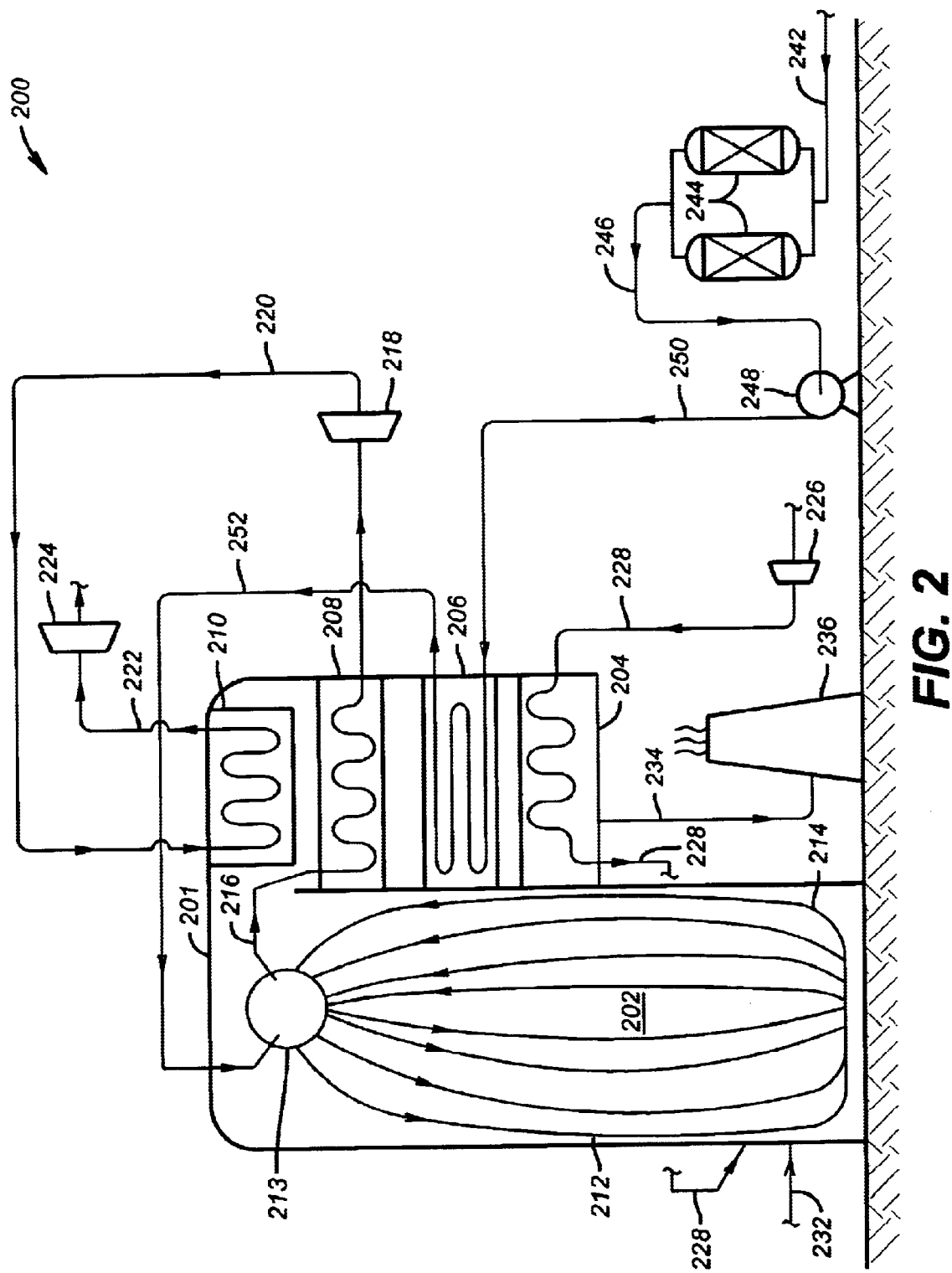

Referring now to FIG. 2, embodiment 200 contemplates several differences from embodiment 100 illustrated in FIG. 1. (Note: FIGS. 2–6 do not have phantom lines indicative of reduce heat transfer areas, for clarity.) Embodiment 200 of FIG. 2 comprises a boiler 201, a furnace 202, an oxygen-enriched air preheater 204, an economizer 206, a superheater 208, and a reheater 210. Embodiment 200 could also include an attemperator, as discussed in relation to FIG. 3, but is not illustrated in FIG. 2. However, note in this embodiment that the reheater, 210 is located not in the radiant section of boiler 201, but in the convection section. As used herein, radiant section refers to any location within boiler 201 where radiant flames could be "seen" by the corresponding device. In contrast, a convection section includes only the non-radiant portions of the boiler. A further difference between preferred embodiments 200 and 100 is that embodiment 200 includes a steam drum 213. Following the route of water through embodiment 200, raw water enters the system at 242 and traverses several treatment steps indicated generically at 244 to form boiler feeedwater. Boiler feedwater traverses through a conduit 246 to suction of a boiler feedwater pump 248 which discharges into a conduit 250. Conduit 250 feeds boiler feedwater to economizer 206, and preheated boiler feedwater exits economizer 206 in conduit 252 which leads directly to steam drum 213. Boiler feedwater traverses downcomer tubes 212 and a combination of water and steam flows up through riser tubes 214 back to steam drum 213. Steam exits steam drum 213 through a conduit 216, which carries steam through superheater 208, thus allowing further heat exchange with hot flue gases in the convection section. Superheated steam thus produced continues its route through conduit 216, eventually reaching high pressure turbine 218. High pressure turbine 218 exhausts into a conduit 220 thus feeding reheater 210, where again the exhaust traversing conduit 220 accepts heat from hot flue gases traversing from furnace 202 into the convection pass of boiler 201. Reheated steam leaves reheater 210 through a conduit 222 and is preferably routed to a second turbine 224 and then is exhausted at a lower pressure. Cooled flue gases leave boiler 201 at 234 and travel to a stack 236. Oxygen-enriched air is compressed or blown using compressor or blower 226 and routed via a conduit 228 to a preheater 204, thereby preheating the oxygen-enriched air. Preheated oxygen-enriched air enters furnace 202 as indicated along with fuel at 232. It will be appreciated that multiple fuel inlets and multiple preheated oxygen-enriched air inlets are contemplated in furnace 202.

Figure 3:
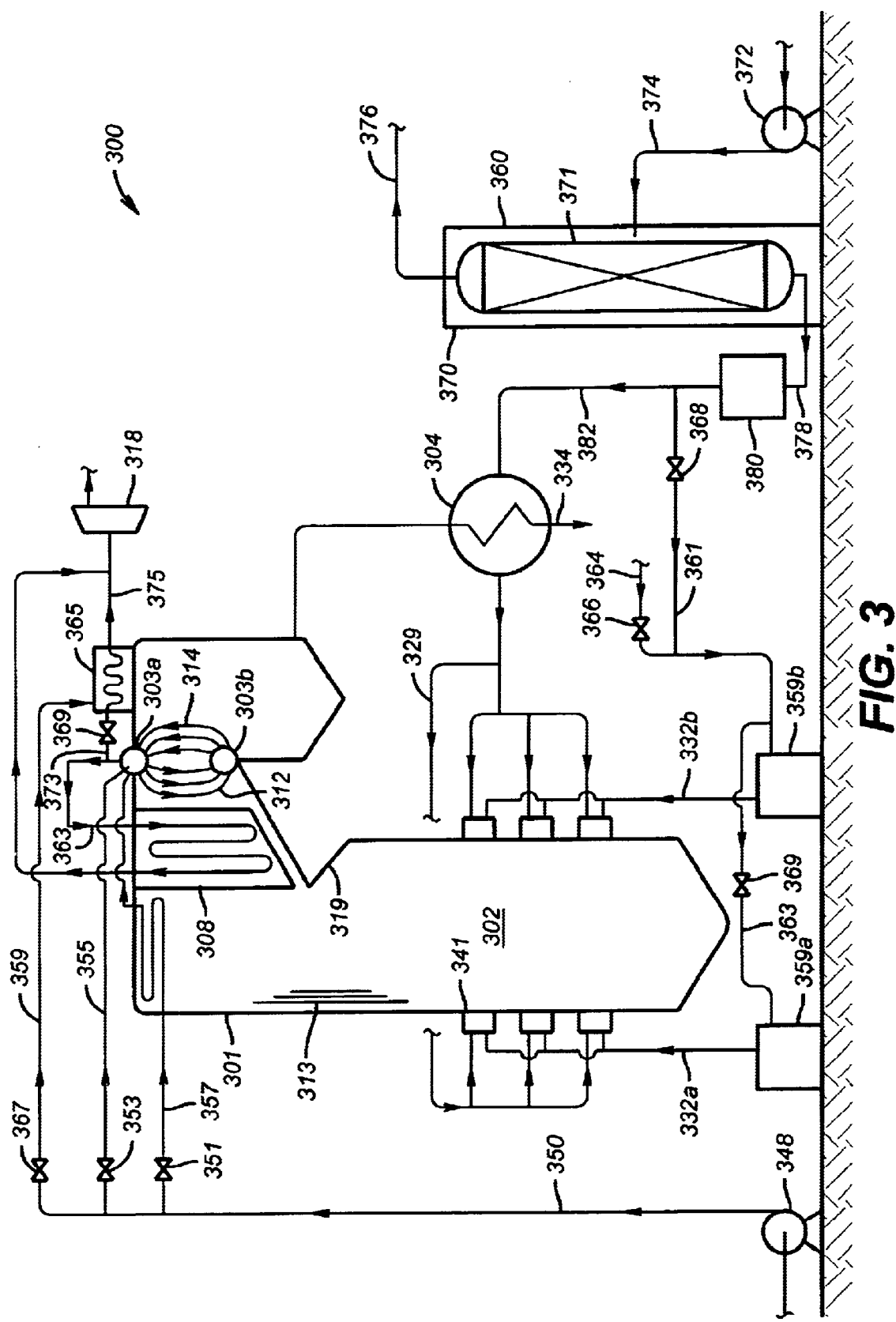

FIG. 3 illustrates another embodiment 300 of an oxygen-enriched air/fuel boiler in accordance with the present invention. This embodiment includes a boiler 301, a furnace 302, steam drums 303a and 303b, an oxidant preheater 304, and a steam superheater 308. Note that embodiment 300 lacks an economizer, although one could be provided. In this embodiment, rather than an economizer there is preferably provided an attemperator 365. An attemperator is an apparatus for reducing and/or controlling the temperature of a superheated vapor or of a fluid passing through it. For example, an attemperator may comprise a bank of tubes, submerged in boiler feedwater, through which all or a part of the superheated steam is diverted to give up some of its heat, thereby regulating the final steam temperature. Embodiment 300 also preferably includes provision of roof section tubes 357, which accept boiler feedwater through conduit 357 and valve 351, if necessary. Given the high temperature of flue gases encountered with all embodiments, and in particular this embodiment (preferably 100% oxygen) additional cooling of furnace 302 may be desirable to prolong furnace life. Furnace tubes 357 are designed for this purpose. Boiler feedwater enters furnace 302 via a boiler feedwater pump 348 and conduit 350, followed by valve 353 and a conduit 355. Conduit 355 feeds steam drum 303a, which in turn feeds downcomer tubes 312 and steam drum 303b, which in turn feeds riser tubes 314 and a header 363. Any boiler feedwater flowing through valve 351 and roof tubes 357 then joins with boiler feedwater/steam mixture collected in steam drum 303a and steam collects in header 363, subsequently being routed into superheater 308. Provision is made for some of the water/steam mixture collected in header 363 to pass through valve 369 and conduit 373 through attemperator 365, and conduit 375, thus rejoining the superheated steam which is then preferably expanded in a single turbine 318.

Embodiment 300 of FIG. 3 also includes an air separation unit at 360, preferably a cryogenic air separation unit or "ASU", comprising a column 371 and a cold box 370. Column 371 is fed compressed, preferably dehumidified air by an air compressor 372 and conduit 374, thus producing a nitrogen-enriched stream 376 and an oxygen-enriched stream 378. Cryogenic air separation is well known in the art and needs no further explanation herein. Other means for separating air may be employed, such as adsorption and membrane units. If a cryogenic ASU is employed, oxygen stream 378 will typically and preferably be liquid, which is then vaporized in a vaporizer 380. Oxygen vapor passes through a conduit 382 and preheater 304 where the oxygen accepts heat from flue gas 334. Fuel enters furnace 302, preferably at multiple locations for multiple burners 341 through conduits 332a and 332b, along with oxidant in conduit 329. For supplying primary oxidant, a portion of non-preheated oxygen is routed through a conduit 361 and valve 368 to coal pulverizer 359b, and another portion is routed through a conduit 363 and valve 369 to coal pulverizer 359a. Air may be supplied for this purpose via a conduit 364 and valve 366.

In this particular embodiment 300, as there is no economizer for the boiler feedwater, the temperature of flue gases entering preheater 304 is substantially higher than a comparable air/fuel boiler with an economizer, due to the dual effects of already higher flue gas temperatures from oxygen/fuel combustion, and lack of heat exchanger with boiler feedwater. Given the higher flue gas temperature, preheating oxygen in preheater 304 does not require as large an area as for air/fuel combustion. Overall, the heat transfer area savings and provision of a single turbine stage (preferably a crossover turbine, where high and low pressure steam is used to drive a shaft for generating power), will lead to increased efficiency and lower fixed and operating costs.

Figure 4:
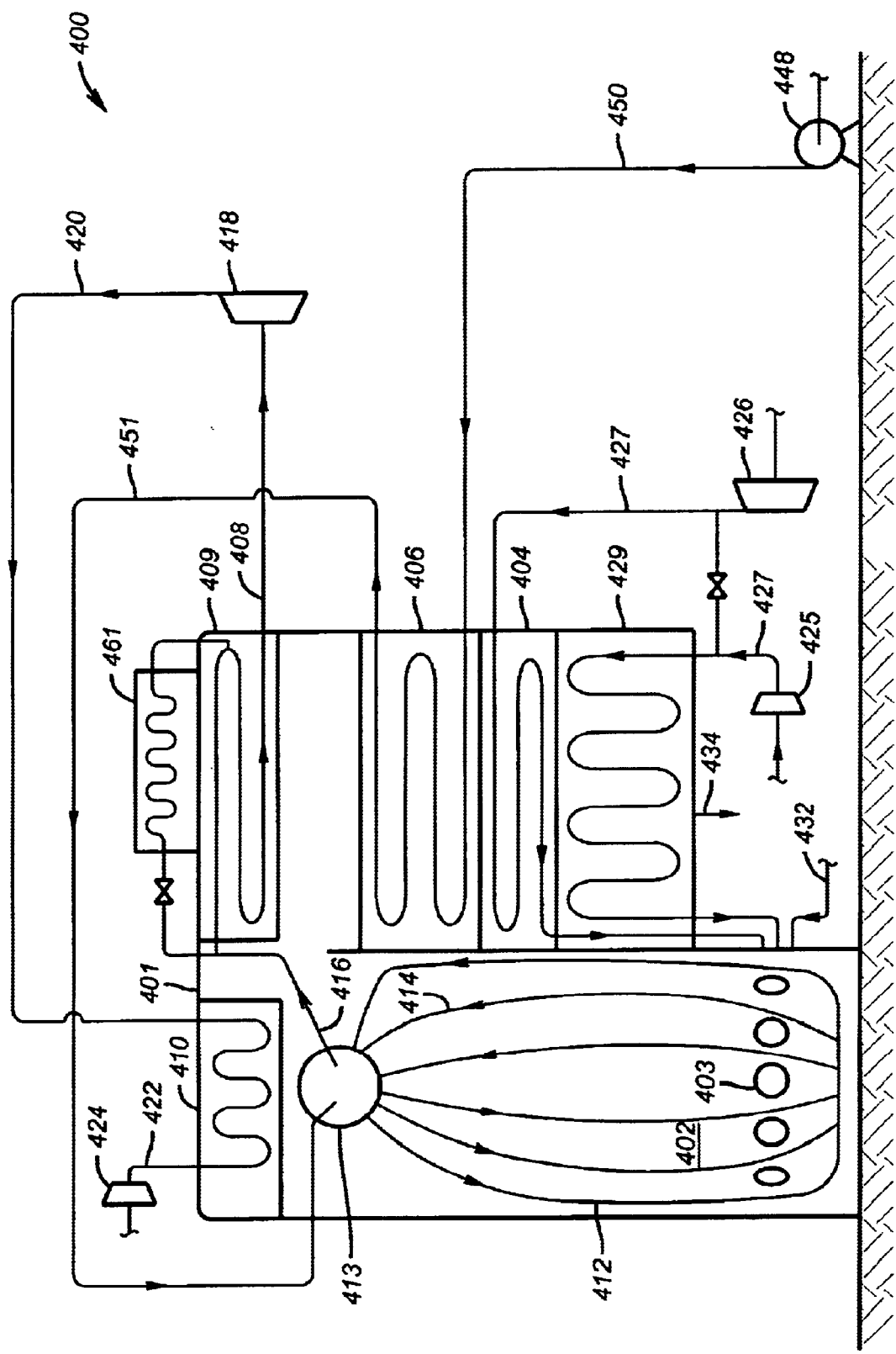

FIG. 4 illustrates another embodiment 400 of boiler in accordance with the present invention. Embodiment 400 encompasses a boiler 401, a furnace 402, a separate oxygen-enriched air preheater 404, separate from an oxygen preheater 429, an economizer 406, and a superheater 409 located in the convection section of furnace 402. Embodiment 400 preferably comprises an attemperator 461 and a radiant reheater 410, reheater 410 preferably positioned in the radiant section. Embodiment 400 further preferably comprises a steamdrum 413, a primary turbine 418 and a secondary turbine 424. Boiler feedwater pump 448 feeds boiler feedwater through a conduit 450 and into economizer 406, which in turn feeds conduit 451 and steam drum 413. Conduit 416 accepts steam from steam drum 413 and directs it into superheater 409 and, if necessary attemperator 461. Attemperator 461 typically and preferably includes connections to supply boiler feedwater as indicated in embodiment 300, FIG. 3, but are not illustrated in FIG. 4 for clarity. Superheated steam exits through a conduit 408 and is let down through a first turbine 418. Exhaust from turbine 418 passes through a conduit 420, is reheated in radiant reheater 410, and exits via a reheated steam conduit 422 and is let down through turbine 424.

Embodiment 400 of FIG. 4 preferably includes the use of both oxygen-enriched air and oxygen as combustion oxidants. An oxygen-enriched air blower or compressor 426 feeds an oxygen-enriched air preheater 404 and oxygen-enriched air is used as the primary oxidant. Oxygen-enriched air is reheated by flue gases 434. Oxygen is compressed or blown via a compressor or blower 425 through conduit 427 and through oxygen preheater 429. Oxygen is then routed to furnace 402 as illustrated in FIG. 4. Fuel enters at 432 to one or more fuel burners 403. Preheated oxygen-enriched air and preheated oxygen are routed to burners 403 as well, promoting efficient burning of fuel in furnace 402. Oxygen may be "lanced" into specific areas of the furnace as well. It will be understood by those having ordinary skill in the boiler art that burner and lance location and positioning are critical to avoid overheating of boiler tubes, membrane walls, furnace walls and roof, to avoid premature corrosion of refractory, and to reduce formation of pollutant species such as NOx or CO. This is an iterative process, primarily based on heat transfer surface areas of the furnace and downcomer and riser tubes, and the positioning of the downcomers and risers with respect to the burners and oxygen lances, if any.

Figure 5:
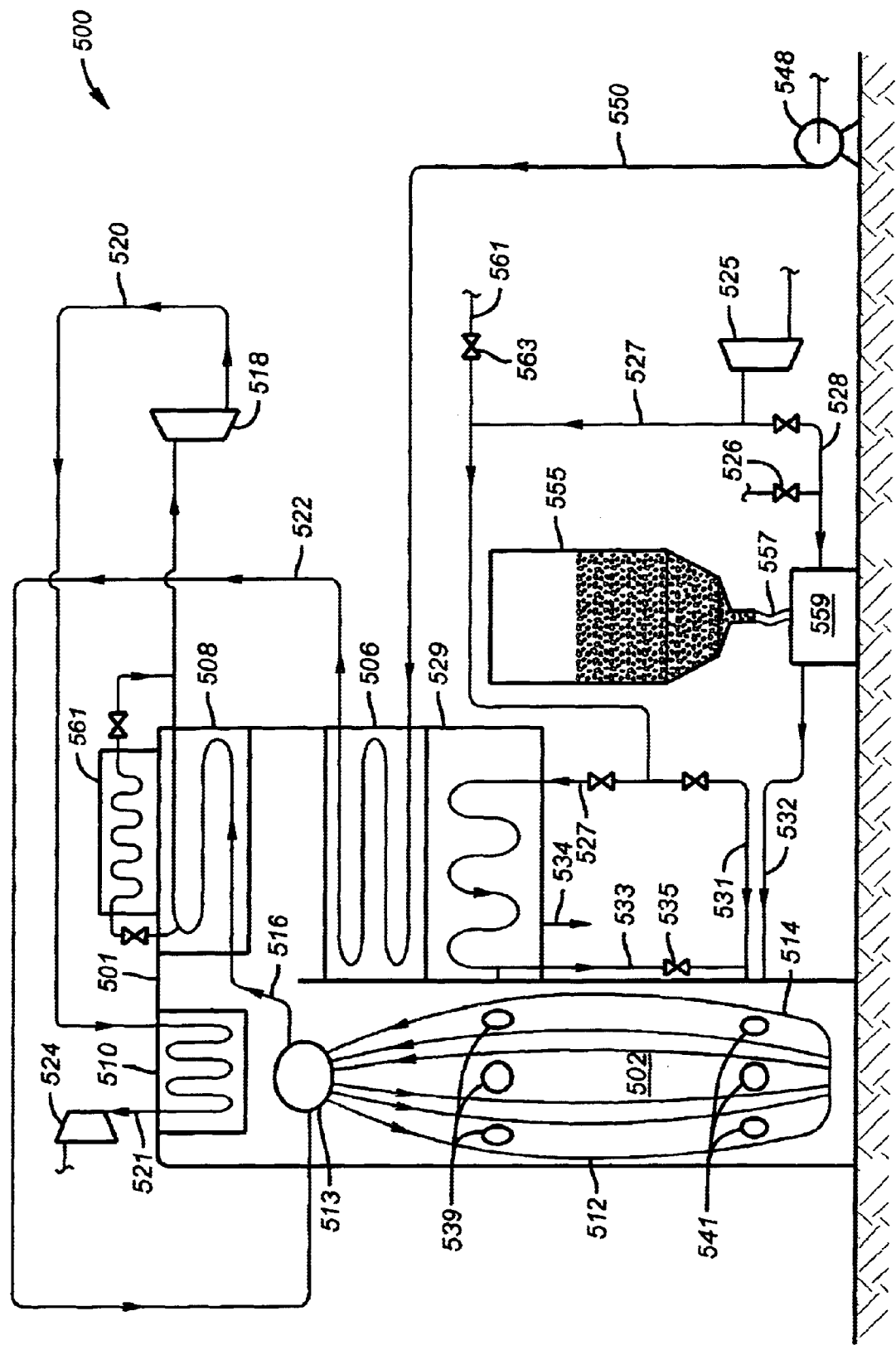

FIG. 5 illustrates a preferred 100 percent oxygen/pulverized coal combustion embodiment 500 which includes a boiler 501, a furnace 502, an oxygen preheater 529, an economizer 506, a steam superheater 508 located in a convection section, and a radiant steam reheater 510. Embodiment 500 also preferably includes a plurality of downcomer tubes 512 and a plurality of riser tubes 514, as well as a steam drum 513. A boiler feedwater pump 548 feeds boiler feedwater through a conduit 550 and into economizer 506, where boiler feedwater exchanges heat with flue gases and exits at conduit 522 and then passes into steam drum 513. Steam exits steam drum 513 through a conduit 516 and is superheated in superheater 508. Superheated steam exits through conduit 516 and is routed into a high pressure turbine 518. Turbine 518 exhausts into conduit 520 which routes reduced pressure steam into radiant reheater 510 and into a conduit 521, which preferably routes reheated steam into a second turbine 524 where the reheated steam is let down in pressure. Embodiment 500 comprises an oxygen blower or compressor 525 feeding a conduit 527. Oxygen may be either preheated in an oxygen preheater 529 and/or fed directly into furnace 502 via one or more conduits 531 to one or more corresponding burners 541. Preheated oxygen flows out of conduit 527 after being preheated in oxygen preheater 529 and preferably flows into secondary combustion burners 539, where oxygen further reacts with unburned fuel in a tertiary combustion stage. Preheated oxygen may also be routed via conduit 533 and valve 535 to burners 541.

A further feature of embodiment 500 includes the provision of a feed unit for coal 555, which feeds a coal pulverization unit 559 through a tube 557. Pulverization unit 559 is also fed with a flow of air through conduit 526 or oxygen-enriched air through a conduit 528, this oxidant usually termed primary oxidant, whose function is to dry and transport pulverized coal to furnace 502. Primary oxidant typically and preferably supplies from about 5 to about 25 percent of the total oxidant required to combust the fuel. Pulverized coal plus primary oxidant is fed to furnace 502 through one or more conduits 532 where pulverized coal is combusted with secondary oxygen supplied from conduits 531 and 533. Oxygen may be supplied from any of the ASU means previously mentioned, or via truck or pipeline. An additional conduit 561 and valve 563 are preferably provided in cases where a source of oxygen is not available or is shut down for some reason, allowing air to be used in an emergency situation, or as a backup.

Figure 6:
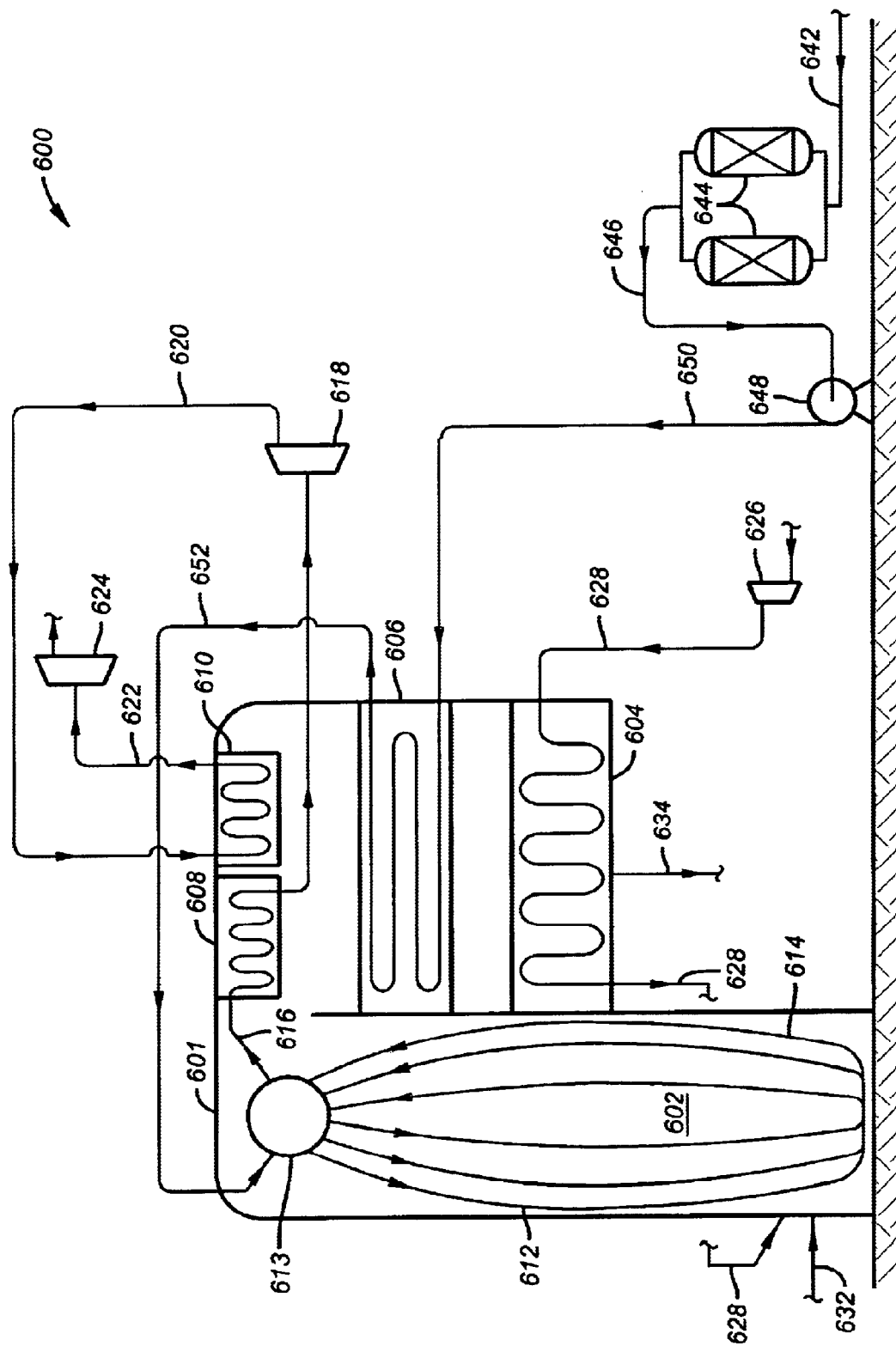

FIG. 6 illustrates a boiler embodiment 600 of the invention that is similar to embodiment 200 of FIG. 2. Embodiment 600 includes a boiler 601, a furnace 602, an oxygen-enriched preheater 604, both a superheater 608 and a reheater 610 in the horizontal convection section, as well as an economizer 606. Embodiment 600 could also include an attemperator, as discussed in relation to FIG. 3, but is not illustrated in FIG. 6. Embodiment 600 includes a steam drum 613. Following the route of water through embodiment 600, raw water enters the system at 642 and traverses several treatment steps indicated generically at 644 to form boiler feedwater. Boiler feedwater traverses through a conduit 646 to suction of a boiler feedwater pump 648 which discharges into a conduit 650. Conduit 650 feeds boiler feedwater to economizer 606, and preheated boiler feedwater exits economizer 606 in conduit 652 which leads directly to steam drum 613. Boiler feedwater traverses downcomer tubes 612 and a combination of water and steam flows up through riser tubes 614 back to steam drum 613. Steam exits steam drum 613 through a conduit 616, which carries steam through superheater 608, thus allowing further heat exchange with hot flue gases in the convection section. Superheated steam thus produced continues its route through conduit 616, eventually reaching high pressure turbine 618. High pressure turbine 618 exhausts into a conduit 620 thus feeding reheater 610, in this embodiment positioned in the convection section, where the exhaust traversing conduit 620 accepts heat from hot flue gases traversing the convection section. Reheated steam leaves reheater 610 through a conduit 622 until it preferably reaches a second turbine 624 and then is exhausted at a lower pressure. Cooled flue gases leave boiler 601 at 634 and travel to a stack (not shown). oxygen-enriched air is compressed or blown using compressor or blower 626 and routed via a conduit 628 to preheater 604, thereby preheating the oxygen-enriched air. Preheated oxygen-enriched air continues in conduit 628 and enters furnace 602 as indicated along with fuel at 632. It will be appreciated that multiple fuel inlets and multiple preheated oxygen-enriched air inlets are contemplated in furnace 602.

Figure 7:
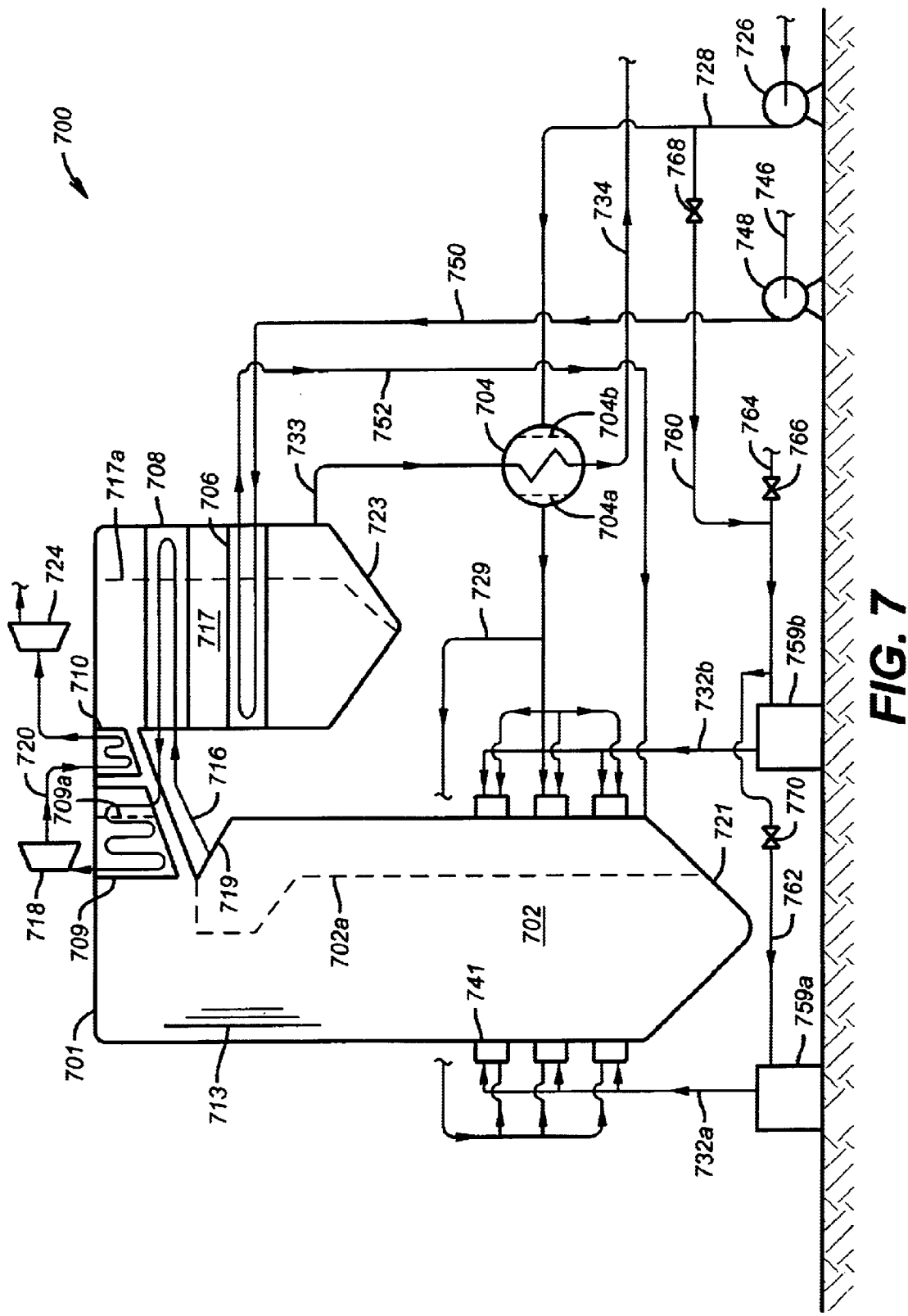

FIG. 7 illustrates a boiler embodiment 700 of the invention of the universal pressure type, suited for combusting pulverized coal. Embodiment 700 includes a boiler 701, a radiant furnace 702, a primary superheater 708, a reheater 710, a secondary superheater 709, an economizer 706, and a preheater 704. Primary superheater and economizer 706 are positioned in a convection section, 717. Furnace 702 also preferably includes a furnace nose, 719, whose purpose, among others, is to modify flue gas circulation in the furnace so as to achieve a more complete combustion of the fuel. Coal pulverizers 759a and 759b feed a plurality of burners 741 (six are illustrated). Hopper sections 721 and 723 catch ash from combustion of coal. Oxygen-enriched air or oxygen is forced through preheater 704 by a blower or compressor 726 via a conduit or duct 728. Preheated oxygen-enriched air or oxygen proceeds to the plurality of burners 741 through another conduit or duct 729, and optionally to other locations of furnace 702, for example for tempering hot flue gases, staging combustion, and the like. For supplying primary oxidant, a portion of non-preheated oxygen-enriched air or oxygen is routed through a conduit 760 and valve 768 to coal pulverizer 759b, and another portion is routed through a conduit 762 and valve 770 to coal pulverizer 759a. Air may be supplied for this purpose via a conduit 764 and valve 766. Flue gases generated by burners 741 traverse radiant furnace 702 and convection section 717, exit through a conduit or duct 733, and are routed to preheater 704. After giving up some heat to oxygen-enriched air or oxygen, cooled flue gases exit via a conduit 734. Boiler feedwater enters the system through a conduit 746, and is pumped by boiler feedwater pump 748 to economizer 706 via a conduit 750. Preheated boiler feedwater exits economizer 706 through a conduit 752 and is routed to a lower area of radiant furnace 702 to a plurality radiant section furnace tubes contained in a membrane wall construction, depicted at 713. Membrane wall 713 extends to cover essentially all of the inner surface of radiant furnace 702 of boiler 701. Importantly, phantom lines 704a, 704b, 702a, 709a, and 717a represent the reduction in heat transfer area due to oxygen-enriched air or oxygen combustion of pulverized coal or other fuel versus a base case air/fuel combustion boiler. The reduced cross section of convection section 717a allows higher velocity flue gas, and thus better heat transfer in all the heat transfer units, and less cost in construction.

Figure 8:
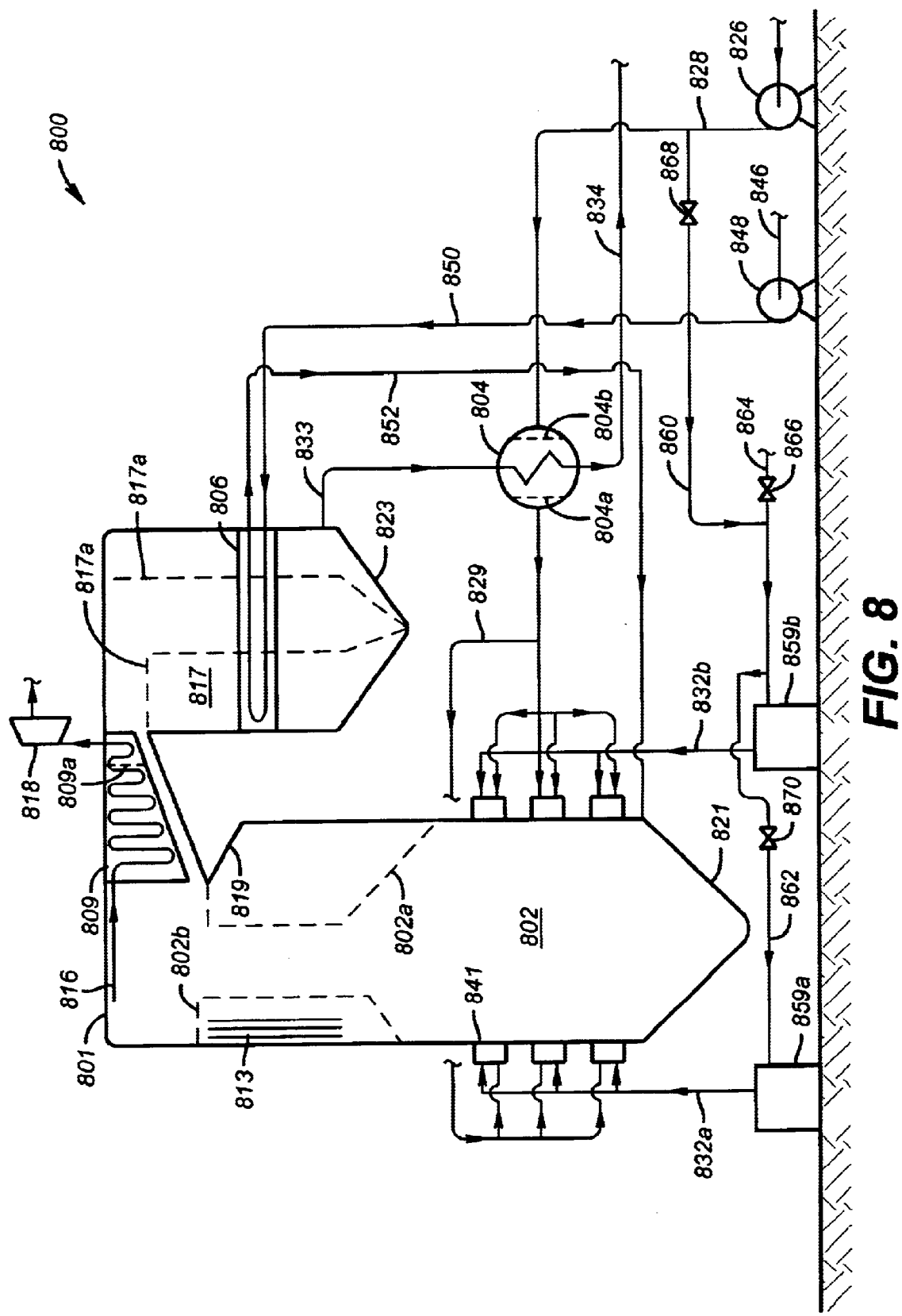

FIG. 8 illustrates a boiler embodiment 800 similar to embodiment 700 of FIG. 7, comprising a boiler 801, a furnace 802, a superheater 809 an economizer 806, and an oxygen-enriched air preheater 804. Embodiment 800 comprises a single turbine 818, as opposed to two turbines in embodiment 700. Superheater 809 and economizer 806 are positioned in a convection section, 817. Furnace 802 also preferably includes a furnace nose, 819. Coal pulverizers 859a and 859b feed a plurality of burners 841 (six are illustrated). Hopper sections 821 and 823 catch ash from combustion of coal. Oxygen-enriched air or oxygen is forced through preheater 804 by a blower or compressor 826 via a conduit or duct 828. Preheated oxygen-enriched air or oxygen proceeds to the plurality of burners 841 through another conduit or duct 829, and optionally to other locations of furnace 802, for example for tempering hot flue gases, staging combustion, and the like. For supplying primary oxidant, a portion of non-preheated oxygen-enriched air or oxygen is routed through a conduit 860 and valve 868 to coal pulverizer 859b, and another portion is routed through a conduit 862 and valve 870 to coal pulverizer 859a. Air may be supplied for this purpose via a conduit 864 and valve 866. Flue gases generated by burners 841 traverse radiant furnace 802 and convection section 817, exit through a conduit or duct 833, and are routed to preheater 804. After giving up some heat to oxygen-enriched air or oxygen, cooled flue gases exit via a conduit 834. Boiler feedwater enters the system through a conduit 846, and is pumped by a boiler feedwater pump 848 to economizer 806 via a conduit 850. Preheated boiler feedwater exits economizer 806 through a conduit 852 and is routed to a lower area of furnace 802 to a plurality radiant section furnace tubes contained in a membrane wall construction, depicted at 813. Membrane wall 813 extends to cover essentially all of the inner surface of radiant furnace 802 of boiler 801. Importantly, phantom lines 804a, 804b, 802a, 802b, 809a, and 817a represent the reduction in heat transfer area due to oxygen-enriched air or oxygen combustion of pulverized coal or other fuel versus a base case air/fuel combustion boiler. It should be noted that heat transfer area reductions represented in these different drawings are mainly symbolic and schematic, and as such, should not be considered as preferred designs for future oxy-fired boilers of reduced size. The reduced cross section of convection section 817a allows higher velocity flue gas, and thus better heat transfer in all the heat transfer units, and less cost in construction.

FIG. 9 is a simplified schematic diagram useful in understanding the flow paths of various streams involved in the heat exchanges of a first boiler in accordance with the present invention, and with the following combustion calculations in the example. Flue gases are produced in a furnace, F and transfer heat to a boiler feedwater stream in furnace F. After exchanging heat with boiler feedwater in furnace F, flue gases proceed to a reheater, RH. Flue gases then exchange heat with steam in a steam superheater, SH, and finally with boiler feedwater in the economizer, E. Following the path of the boiler feedwater, boiler feedwater exchanges heat first with flue gas in economizer, E, and secondly with flue gases in furnace, F, and then with flue gases again in superheater, SH. The boiler feedwater at this point has preferably been transformed into superheated steam, which is expanded in a turbine T2 thus producing power. Exhaust from turbine T2 is reheated in reheater, RH, and this reheated steam then sent to steam turbine T1, producing additional power.

As noted in FIG. 9, various stations or nodes indicating boiler feedwater are indicated as stations or nodes 1, 2, 3, 4, 5 and, 6. Similar stations or nodes for the flue gas are designated 1g, 2g, 3g, 4g, 5g, 6g. An oxygen or oxygen-enriched air preheater is not indicated in FIG. 9, but the temperature of flue gases exiting the oxygen-enriched air preheater would be indicated as $T_7g$.

Each boiler embodiment of the invention may be constructed and operated in subcritical or supercritical mode (including ultra-supercritical mode), depending on the needs of the particular customer. Boilers of the invention may be permanent, packaged, stationary, Stirling type, universal pressure, radiant, combined cycle, cogeneration or any other type. Boilers of the invention may find use as black liquor recovery boilers, may employ staged combustion, and may be used on ships, submarines, planes, trains, and automobiles. Water/steam circulation may be natural, forced, or combinations thereof. One or more boiler feedwater pumps may be employed, as well as multiple water treatment units, multiple superheaters, economizers, reheaters, attemperators, letdown valves, steam drums, and turbines. Blowdowns and other controls are preferably provided, either manual or automated. When a steam drum is provided, suitable steam washing facilities are preferably provided, preferably inside the steam drum, the need for steam washing increasing as the pressure increases.

Preheaters useful in the invention may employ heat exchangers designed as described in assignee's U.S. Pat. No. 6,273,180, incorporated herein by reference. To further insure resistance to corrosion, radiant and convection tubes and membrane walls (if used) are preferably constructed of an iron, chromium and nickel (Ni—Fe—Cr) alloy, such as the various types of Inconel, and may include ceramic coatings as discussed in the 180 patent where oxygen concentration is expected to be high, for example, full 100 percent oxygen/fuel firing. The furnace walls and roof of the radiant and convection sections of the furnace preferably are lined with tubes or membrane walls including tubes, and the use of ceramic refractory materials is preferably limited to seal areas, wall penetrations, door and wall box seals, and the like. Castable and plastic refractories are preferred.

The term "fuel", as used herein, means a combustible composition comprising a major portion of, for example, methane, natural gas, liquefied natural gas, propane, atomized oil (either in gaseous or liquid form), pulverized coal, and mixtures thereof. Fuels useful in the invention may comprise minor amounts of non-fuels therein, including oxidants, for purposes such as premixing the fuel with the oxidant, or atomizing liquid fuels. The term "oxidant", according to the present invention, means a gas with an oxygen molar concentration greater than air. Such oxidants include oxygen-enriched air containing at least 50 percent vol., oxygen, preferably at least 90 percent vol. oxygen, such as "industrially" pure oxygen (99.5 percent) produced by a cryogenic air separation plant or non-pure oxygen produced by, for example, a vacuum swing adsorption process (about 90 percent vol. $O_2$ or more) or "impure" oxygen produced from air or any other source by filtration, adsorption, absorption, membrane separation, or the like, at either room temperature or in preheated form. It is also important to note that, although in most instances it is preferred that the main and secondary oxidants be the same in chemical composition, they could be different. That is, the secondary oxidant could be air while the primary oxidant is industrially pure oxygen, or vice versa; or the secondary oxidant could be impure oxygen while the primary oxidant is industrially pure oxygen, or vice versa.

While boiler apparatus and methods of the invention are designed to operate without flue gas recirculation (FGR), piping for local use of FGR may be installed to allow, for example, FGR upon start-up or during emergency situations. Thus, while FGR is not preferred, as in assignee's U.S. Pat. No. 6,314,896, it may be important for safety reasons to have piping installed allowing FGR. Use of local or emergency FGR is considered within the scope of the invention.

EXAMPLE

The following example illustrates one preferred method of calculating the heat transfer surface areas of steam generation apparatus of the invention. This example, however, merely illustrates various principles of the invention and is not to be construed as limiting in any fashion the scope of the appended claims.

Principle of the Analysis

This section provides the combustion calculus for an existing boiler (the base case), the analysis of the impact of oxygen enrichment/full oxygen firing on the flue gas temperatures, and evaluation of the heat transfer surface areas necessary for a boiler of the invention that uses oxygen-enriched combustion.

The existing boiler considered, operating with atmospheric air and representing the Base Case, is a SCRRP (Supercritical, Radiant, Reheat and Pressurized). The data sheet of this boiler is summarized in Table 1. It must be noted that the same analysis can be easily extended to any type of boiler. The circulation scheme of the boiler is presented in FIGS. 1 and 9 and it corresponds to the once-through scheme where the superheater stages are located in the downflow convection pass and the reheater is situated in the horizontal section, being directly exposed to the flame radiation.

The entire algorithm of combustion calculations, followed by the heat transfer calculus has been performed in order to establish the geometry of the different heat exchangers. The same procedure has been applied for the base case and for the oxygen enrichment cases, and the results have been compared. Some preferred algorithms for combustion and heat transfer calculus are described, but are by no means the only ones that could be used.

TABLE 1

Base case boiler data sheet

HEAT TRANSFER SURFACES

| | |
|---|---|
| Furnace | Volume □ 3270 m³ |
| Superheater | Multistage, bank of staggered pipes |
| Reheater | Single stage, bank of staggered pipes |
| Economizer 1 | Single stage, bank of staggered pipes with spiral fins; Heat transfer surface area □ 16000 m² |

OPERATING CONDITIONS

| | |
|---|---|
| Steam mass flow rate (m')-primary: 1350 t/h | Steam mass flow rate (m")-reheat: 1260 t/h |
| Feedwater temperature: 260.5° C. | Air temperature leaving Air Heater: 318° C. |
| Superheater inlet/outlet temperatures: 374/540° C. | Reheater inlet/outlet temperatures: 305/538° C. |
| Gases temperature leaving Economizer: 376.7° C. | Superheater outlet pressure: 245 bar |
| Excess air: 7% | Gas temperature from Air Heater: 133.3° C. |

FUEL

Natural gas: 86.5% $CH_4$, 7.9% $C_2H_6$, 2.2% $C_3H_8$, 0.3% $C_4H_{10}$, 0.5% $CO_2$, 2.6% $N_2$

Heat Rates and Temperatures

The beneficial consequences of the oxygen-enriched combustion can be evaluated by considering several situations, depending on the initial hypotheses of the analysis. From these situations, the design of a new generation of advanced boilers, using oxygen-enriched combustion air was considered.

The analysis performed takes into consideration two cases of boilers, different from the initial one from the standpoint of the heat transfer surface areas. The common feature is represented by the heat rates for each heat exchanger, which are imposed to be equal with those from the Base Case. We consider the following cases:

1. The Air preheating temperature is equal to the one from the Base Case ($T_{PH}$=590 K);
2. The Air preheating temperature results from the heat balance equation of the air preheater.

The heat rates are as follows:

The overall heat rate of the boiler: $\dot{Q}_b = \dot{m}' \cdot (h_{m3} - h_{m6}) + \dot{m}'' \cdot (h_{m5} - h_{m4}) = 1020000$ [kW]

The heat rate of the economizer: $\dot{Q}_E = \dot{m}' \cdot (h_{m1} - h_{m6}) = 86887$ [kW]

The heat rate of the furnace: $\dot{Q}_F = \dot{m}' \cdot (h_{m2} - h_{m1}) = 170000$ [kW]

The heat rate of the reheater: $\dot{Q}_{RH} = \dot{m}'' \cdot (h_{m5} - h_{m4}) = 205590$ [kW]

The heat rate of the superheater: $\dot{Q}_S = \dot{m}' \cdot (h_{m3} - h_{m2}) = 557542$ [kW]

The heat rate of the air heater:

$$\dot{Q}_{AH} = \dot{V}_f \cdot \lambda_{excess} \cdot \dot{V}_{air}^{min} \int_{299.82}^{T_{PH}} c_{p,air} \cdot dT$$

where $\lambda_{excess} = 1.07$ is the air excess coefficient, $\dot{V}_{air}^{min}$ is the minimum necessary air volume, $\zeta_{air\ heater} = 0.985$ is the coefficient of heat losses within the air heater, $T_{PH}$ is the temperature of the preheated air (imposed).

The heat rate of the air heater (as a function of $T_{PH}$ and of the mole fraction of $O_2$) is displayed in table 2.

TABLE 2

Heat rate of air heater function of $T_{PH}$ and $O_2$ mole fraction

| $O_2$ mole fraction in oxidant [%] | $T_{PH}$ [K] | $Q_{AH}$ [kW] |
|---|---|---|
| 100 | 590 | 26626 |
| 75 | | 35160 |
| 50 | | 52229 |
| 35 | | 74175 |
| 25 | | 103436 |
| 21 | | 122943 |
| 100 | 722 | 39506 |
| 75 | 693 | 48301 |
| 50 | 657 | 64789 |
| 35 | 631 | 85013 |
| 25 | 607 | 109669 |

The mean temperatures $T_{1g}$, $T_{2g}$, $T_{3g}=T_{4g}$, $T_{5g}$, $T_{6g}$, and $T_{7g}$ (after the air heater) in the flue gases flow sections 1g, 2g, 3g=4g, 5g, 6g, and 7g were calculated by the trial-and-error on the basis of the heat balance equations of the heat exchangers F, RH, S, and E the air heater. The calculated values of $(T_{jg})_j = (1\ \text{to}\ 7)$ are included in Tables 3 and 4.

TABLE 3

Temperatures of flue gases for $T_{PH} = 590$ K

| $O_2$ mole fraction in air [%] | $T_{1g}$ [K] | $T_{2g}$ [K] | $T_{3g} = T_{4g}$ [K] | $T_{5g}$ [K] | $T_{6g}$ [K] | $T_{7g}$ [K] |
|---|---|---|---|---|---|---|
| 100 | 3077.6 | 2951.6 | 2764.6 | 1252.6 | 782.6 | 632.8 |
| 75 | 2994.7 | 2863.7 | 2666.7 | 1165.7 | 753.7 | 582.4 |
| 50 | 2850.2 | 2707.2 | 2487.2 | 1024.2 | 717.2 | 517.1 |
| 35 | 2680.3 | 2521.3 | 2265.3 | 949.3 | 691.3 | 469 |
| 25 | 2466.1 | 2280.1 | 1980.1 | 867.1 | 667.1 | 427 |
| 21 | 2326.3 | 2119 | 1820.5 | 829.5 | 649.8 | 401.5 |

TABLE 4

Temperatures of flue gases for $T_{PH} > 590$ K

| $O_2$ mole fraction in air [%] | $T_{1g}$ [K] | $T_{2g}$ [K] | $T_{3g} = T_{4g}$ [K] | $T_{5g}$ [K] | $T_{6g}$ [K] | $T_{7g}$ [K] | $T_{PH}$ [K] |
|---|---|---|---|---|---|---|---|
| 100 | 3089.9 | 2966.9 | 2784.9 | 1322.9 | 857.9 | 638.7 | 722 |
| 75 | 3007.3 | 2878.3 | 2686.3 | 1219.3 | 812.3 | 579.1 | 693 |
| 50 | 2861.9 | 2721.9 | 2506.9 | 1077.9 | 753.9 | 506.7 | 657 |
| 35 | 2690.5 | 2533.5 | 2281.5 | 978.5 | 724.5 | 471.1 | 631 |
| 25 | 2472.5 | 2288.5 | 1989.5 | 879.5 | 679.5 | 425.3 | 607 |
| 21 | 2326.3 | 2119 | 1820.5 | 829.5 | 649.8 | 401.5 | 590 |

Evaluation of the Heat Transfer Surface Areas

For each of the two cases ($T_{PH}$=590 K and $T_{PH}$ calculated), the new values of the heat transfer surface areas of the heat exchangers (economizer E, furnace F, reheater RH and superheater S) were computed, by using adapted versions of the computer codes that had been developed and used for the Base Case.

The data have been processed and plots resulted, each of them highlighting the influence of the oxygen percentage over the diminution of the heat transfer surface areas compared to the Base Case (FIGS. 10 and 11 for the economizer and the superheater, respectively).

Figure 12:
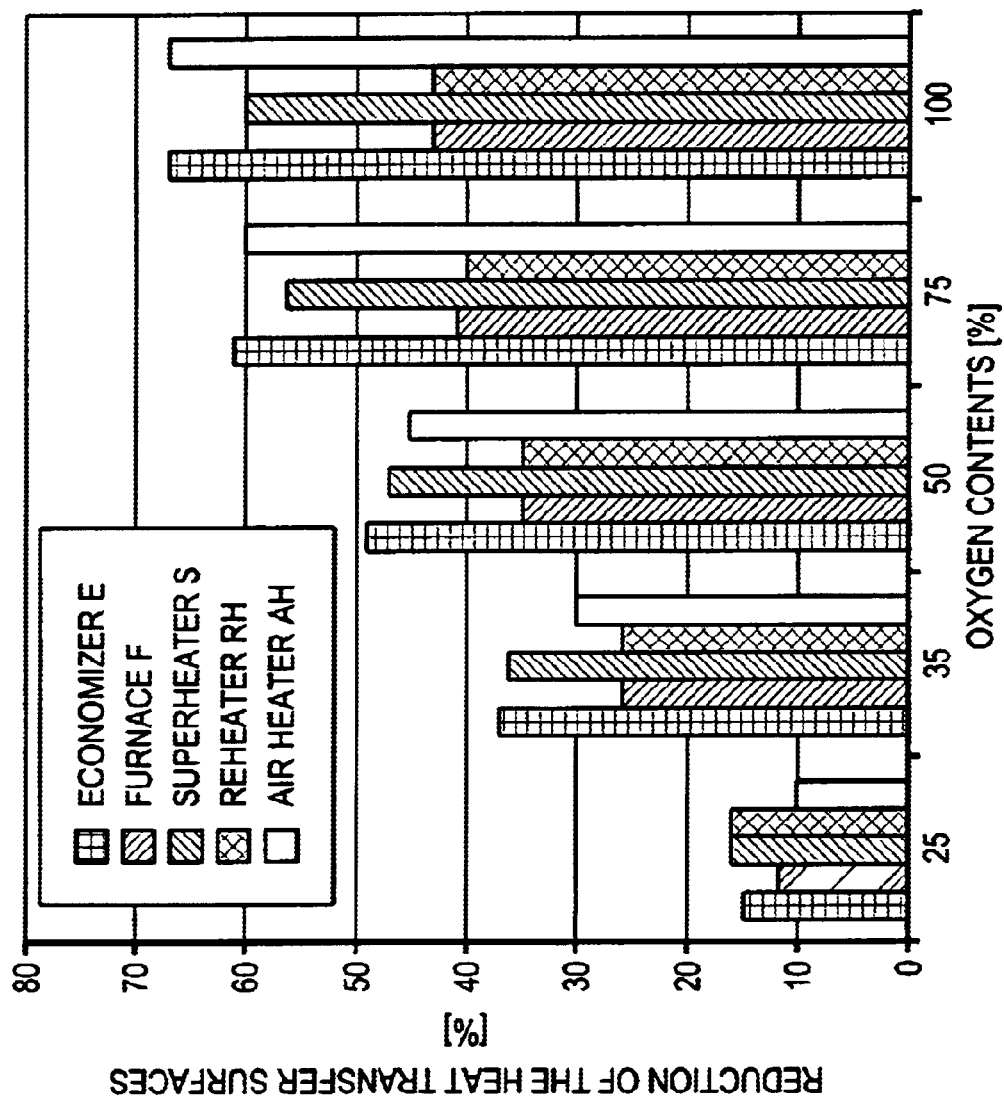

These calculations for a supercritical boiler of 1020 MW thermal power that supplies steam for a turbine-generator group of 350 MWe resulted in the shrinkage of the heat transfer surface areas as displayed in FIG. 12.

The development of a new generation of advanced, preferably compact boilers with lower initial investments is further analyzed below. The use of the oxygen for this situation should be optimized by comparing the shares of all the operating costs, of the payback of the initial investment, and of the profit from the sold energy produced by the boiler. We have to make this comparison knowing that a large boiler has a lifetime of maximum 50 years.

According to the results obtained in the above theoretical study, it appears that the use of oxygen-enriched combustion in boilers leads to the following beneficial consequences:

The oxygen enrichment of the oxidant rises significantly the temperature of the flame and of the flue gases, which allows indirectly a dramatic reduction of the heat transfer surface areas required for a same steam production (mainly because of the higher log mean temperature differences—LMTD—induced within the heat exchangers of the boiler).

The possible growth of temperature of the preheated oxygen-enriched air (due to the lower flow rate of oxidant through the air heater and to the higher temperature of the flue gases) can cause an additional increase of the temperature of the flame, which amplifies the diminution of the heat transfer surface areas of the boiler.

Therefore, this invention promotes a completely new generation of boilers, fully dedicated and adapted to oxygen-enriched combustion. It is claimed that such boilers, operating with oxidants containing more than 21% oxygen (and up to 100%, in case of full oxy-combustion), will be characterized by reduced heat transfer surface areas, when compared to air-fired boilers. This will directly affect the dimensions of the entire boiler, all the more since the volume of flue gases will also be reduced. For instance, smaller fuel-oxidant flow rates require smaller ducts, transport fans, electro-filters, and the like. A boiler is a very expensive installation, with capital costs around 15–20% of the overall plant cost, and most of these costs are associated with high-grade materials. Significant savings can thus be obtained by reducing the size of the boiler, at least partly offsetting the additional cost of oxygen.

The inventive boilers have the advantage of being specially designed for the particular heat transfer patterns linked to oxygen-enriched combustion. Heat exchanger geometry and location will be adapted to the new flue gas temperature distribution and flow rate. By this way, the proposed invention will allow avoiding such problems as pipe overheating, due to effects of locally superheating the steam, which can eventually cause cracks in pipes. This is a crucial advantage compared to existing boilers using oxygen enrichment as a retrofit technology, where such technical issues may be encountered. Actually, with the boilers of the invention, it won't be necessary to implement such corrective techniques as Flue Gas Recirculation, which can significantly moderate the benefits achieved with oxygen enrichment.

In addition to the shrinkage of the boiler dimensions, the designs proposed in this invention for a new oxy-fuel fired boiler will also lead to a substantial increase of the boiler's thermodynamic efficiency, compared to the air-based case (anywhere from 2 to 5%). There are several reasons for this increase, among which are:

Since the O2 fraction in the air increases, a reduced amount of nitrogen is dumped in the atmosphere at temperatures higher than the inlet temperatures, which limits the heat rejected at the stack.

The increase of the flame and flue gases temperatures has a direct effect on the local radiative heat transfer. Regarding the convective transfer, which could be affected by the flow rates reduction, it can be maintained or even slightly enhanced through an appropriate design of the boiler pipes arrangement.

Since the boiler size is reduced, the wall losses will be also reduced, because of the direct relation between these losses and the wall surface area.

This invention will also be beneficial in terms of NOx reduction techniques. In theory, oxygen-enriched combustion may increase the $NO_x$ emissions due to the higher flame temperatures than in the case of atmospheric air combustion. In practice, measures can be taken to maintain/reduce the NOx emissions in oxygen-enriched conditions, such as staged combustion, and the like.

In any event, in certain areas special efforts must be dedicated to the reduction of these emissions. The recommended measures to be taken when dramatic reductions are needed are the use of post-combustion techniques such as SNCR (selective non-catalytic reduction) or SCR (selective catalytic reduction), combined with low excess air combustion and special combustion techniques, such as staged combustion or flue gas recirculation.

Since this invention deals with new boilers and methods of operating same, the $NO_x$ reduction techniques that otherwise would have to be implemented may be the same as those for new boilers with atmospheric air combustion. But by lowering the amount of flue gas treated, significant economical advantages in terms of emission control technology should result from the use of these new oxygen-enriched/full oxy-fired boilers.

Finally, the last advantage of this new boiler design is its particular suitability for $CO_2$ capture techniques. Actually, the ultimate method of reducing $CO_2$ emissions is natural sequestration. Several methods of sequestering CO2 have been proposed so far, most of them still in preliminary stages. But regardless of the method, the carbon dioxide has to be concentrated in the flue gas stream, in order to be further conditioned and sequestered. On this point, a highly oxygen-enriched boiler, or alternatively a full oxy-fired boiler, designed accordingly to the concept proposed in this invention, will significantly increase the potential interest of $CO_2$ sequestration, through a dramatic cost reduction of the conditioning process. Indeed, the $CO_2$ concentration in the flue gas will, of course, be higher than in a conventional air-fired scheme due to the absence of nitrogen; but on top of this, the amount of flue gas to be conditioned will also be lower, both of these aspects leading to operational and economical benefits. Studies have shown that this is a more cost effective $CO_2$ capture process than the alternative method of flue gas scrubbing with chemical absorbents such as MEA (monoethanolamine).

As a conclusion, the new concept of boilers promoted in this invention, fully. dedicated to oxygen-enriched combustion and thus characterized by reduced dimensions, will allow boiler operators to dramatically reduce their investment costs for a same steam production, compared to conventional air-fired boilers.

As demonstrated, the adapted use of oxygen enrichment will lead to noticeable fuel savings, attributed to increased thermodynamic efficiency. The level of enrichment should then be optimized case by case, balancing the cost of oxygen enrichment with the related achievable fuel savings. In any case, the operating costs of this new generation of boilers should also remain lower than those of existing air-fired boilers.

Finally, such new boilers will have crucial advantages in terms of emissions reduction techniques. Especially, the reduced and highly $CO_2$-concentrated flue gases will enhance the cost-effectiveness of $CO_2$ capture processes, thus increasing their potential attractiveness.

One algorithm for the combustion and heat transfer calculus is now described. It will be understood that other algorithms will be useful in practicing the various embodiments of the invention.

1) Combustion Calculus

The preliminary steps in the combustion calculus were:
  The determination of the minimum volumes of oxygen, dry air, humid air (an average air humidity of 40% has been assumed), and of the combustion air necessary for burning a cubic meter of fuel.
  The calculus of the volumes of combustion products and of flue gases per cubic meter of burned fuel.

1.1. Combustion Calculus with Dissociation

The algorithm of the combustion calculus was constructed by using numerical techniques adapted to the sets of non-linear equations that result from the stoichiometric reactions governing the dissociation phenomena. The products of the combustion reactions in the absence of dissociation are $CO_2$ and $H_2O$ which are present in the flue gases along with the gases that do not participate in combustion, $N_2$ and $O_2$ (the latter is absent when there is no excess air). For the sake of simplicity, let us replace:

$$V_{CO_2}^{fg} \text{ by } y_1, \quad V_{H_2O}^{fg} \text{ by } y_2, \quad V_{N_2}^{fg} \text{ by } y_3, \text{ and } V_{O_2}^{excess,fg} \text{ by } y_4.$$

These gases dissociate due to the high temperatures generated by combustion. The products of the dissociation reactions dissociate themselves, resulting a chain of dissociation reactions. It is very difficult to evaluate the effect of these reactions and therefore, to simplify this task, only the most important ones were considered, which were divided into primary reactions (dissociation of combustion results) and secondary reactions (in which some products of the primary reactions participate among the reactants). The synopsis of the dissociation reactions is displayed in Table 6.

The calculus of the volumes of dissociation products necessitates the determination of the fractions of the initial quantities that are converted into dissociated products. These fractions have been calculated from the relations of the kinetic constants of the reactions, which were determined from tables in function of the temperature.

Calculus of the Volumes of Reactants, Products, and Flue Gases

By using Table 2, we have derived the expressions for the volumes of $CO_2$, $H_2O$, $H_2$, $CO$, $O_2$, $OH$, $O$, $H$, $N_2$, $NO$, and $N$ and by adding them, the expression of the flue gases volume after dissociation was obtained:

$$V_{fg} = (1+a+ae)y_1 + (1+b+c+be+2bg+cg)y_2 + \quad (1)$$
$$(1+d)y_3 + (1+e)y_4 \left[ \frac{m^3 \text{ flue gases}}{m^3 \text{ fuel}} \right]$$

Calculus of the Dissociated Fractions

The general expression of a chemical reaction is "Sonntag and Van Wylen (1982)":

$$v_A \cdot A + v_B \cdot B \rightleftharpoons v_C \cdot C + v_D \cdot D \quad (2)$$

where $v_A$, $v_B$, $v_c$ and $v_D$ represent the stoichiometric coefficients of the reactions.

The reaction can take place in both senses and the "control" over its direction and "intensity" is exerted by the temperature-dependent equilibrium constant K, whose expression is:

$$K = \frac{z_C^{v_C} \cdot z_D^{v_D}}{z_A^{v_A} \cdot z_B^{v_B}} \left( \frac{p}{p_0} \right)^{v_C + v_D + v_A - v_B} \quad (3)$$

where $z_A$, $z_B$, $z_C$ and $z_D$ are the equilibrium mole fractions of reactants and products.

TABLE 6

Synopsis of the Dissociation Reactions and of the Reactants and Products Balances

| REACTION | VOLUMES OF REACTANTS | RESULTING VOLUMES AFTER DISSOCIATION | | |
|---|---|---|---|---|
| | | As final products | As secondary products participating in other reactions | Consumed from the reactants |
| A. PRIMARY REACTIONS | | | | |
| $2\ CO_2 = 2\ CO + O_2$<br>1    0    0<br>−2 a   2 a  a<br>1 − 2 a  2 a  a | $y_1\ [m^3 CO_2/m^3$ fuel] | $(1 − 2\ a)y_1\ [m^3 CO_2/m^3$ fuel]<br>$2\ ay_1\ [m^3 CO/m^3$ fuel] | $ay_1$<br>$[m^3 O_2/m^3$ fuel] | $-2\ ay_1\ [m^3 CO_2/m^3$ fuel] |
| $2\ H_2O = 2\ H_2 + O_2$<br>1    0    0<br>−2 b   2 b  b<br>1 − 2 b  2 b  b | $y_2\ [m^3/m^3$ fuel] | | $2\ by_2 [m^3 H_2/m^3$ fuel]<br>$by_2$<br>$m^3 O_2/m^3$ fuel] | $2\ by_2\ [m^3 H_2O/m^3$ fuel] |
| $2\ H_2O = 2\ OH + H_2$<br>1    0    0<br>−2 c   2 c  c<br>1 − 2 c  2 c  c | | $2\ cy_2\ [m^3 OH/m^3$ fuel] | $cy_2$<br>$[m^3 H_2/m^3$ fuel] | $-2\ cy_2\ [m^3 H_2O/m^3$ fuel] |
| | Remaining $H_2O$ balance | $(1 − 2\ b − 2\ c)y_2$<br>$[m^3 H_2O/m^3$ fuel] | | |
| $N_2 = 2N$<br>1    0<br>−d   2 d<br>1 − d  2 d | $y_3\ [m^3 N_2/m^3$ fuel] | $2\ dy_3\ [m^3 N/m^3$ fuel] | | $-dy_3\ [m^3 N_2/m^3$ fuel] |
| B. REACTIONS WITH PRIMARY REACTIONS PRODUCTS AS REACTANTS | | | | |
| $O_2 = 2\ O$<br>1    0<br>−e   2 e<br>1 − e  2 e | $y_4' =$<br>$y_4 + ay_1 + by_2$<br>$[m^3 O_2/m^3$ fuel] | $2\ e(y_4 + ay_1 + by_2)$<br>$[m^3 O/m^3$ fuel] | | $-e(y_4 + ay_1 + by_2)$ |
| $O_2 + N_2 = 2\ NO$<br>1    1    0<br>−f   −f  2 f<br>1 − f  1 − f  2 f | $y_3\ [m^3 N_2/m^3$ fuel] | $2\ fy_3$<br>$[m^3 NO/m^3$ fuel] | | $-fy_3\ [m^3 O_2/m^3$ fuel]<br>$-fy_3\ [m^3 N_2/m^3$ fuel] |
| | Remaining $O_2$ balance<br>Remaining $N_2$ balance | $(1 − e)(y_4 + ay_1 + by_2) − fy_3$<br>$[m^3\ O_2/m^3$ fuel]<br>$(1 − d − f)y_3$<br>$[m^3 N_2/m^3$ fuel] | | |
| $H_2 \square\ 2\ H$<br>1    0<br>−g   2 g<br>1 − g  2 g | $(2\ b + c)y_2$<br>$[m^3 H_2/m^3$ fuel] | $(1 − g)(2\ b + c)y_2$<br>$[m^3 H_2/m^3$ fuel]<br>$2\ g(2\ b + c)y_2$<br>$[m^3 H/m^3$ fuel] | | $-g(2\ b + c)y_2$<br>$[m^3 H_2/m^3$ fuel] |

The procedure used here in the calculation of the dissociation fractions for the considered reactions consisted of the derivation of the general expressions of the equilibrium constants for each equation (that contain all the dissociation fractions and primary products volumes), followed by the writing of their simplified expressions for the initial step. The simplified expressions were necessary since the dissociation reactions take place simultaneously and the solution of the set of nonlinear equations that result is very difficult to obtain. Consequently, a trial-and-error iterative method was used, easy to transpose into computer codes. The first step uses these simplified expressions to calculate the initial dissociation fractions, which are utilized as start values for the iterations that provide (by means of the general expressions) the final values.

The expressions for the equilibrium constants resulted as functions of the dissociated fractions a, b, c, d, e, f, g, and h. To obtain the simplified expressions for the first step of the procedure it was assumed that only the considered product dissociates, meaning that the other dissociation fractions equal zero. This allowed to calculate a start value for the particular fraction. In the following step, we computed its value by using the values of the fractions obtained in the first step and so forth.

Calculus of the Equilibrium Constants of Dissociation Reactions

The calculation process implies information over the temperature-dependence of the equilibrium constants. We took this information from "Sonntag and Van Wylen (1982)", but since the values of the equilibrium constants are tabulated only for certain temperatures, we had to make conjectures over their temperature-dependence. From "Bescov, (1953)", we found that a fuiction that describes this variation with a very good accuracy is given by:

$$\ln K = -\frac{1}{T}x_1 + (\ln T)x_2 + Tx_3 + T^2 x_4 + T^3 x_5 \quad (4)$$

If the values of the coefficients $x_i$ are known for the fixed range of temperatures, then one can compute the value of the equilibrium constant for every temperature within this range.

Consequently, the total temperature range of the equilibrium constants' table was divided into five sub-ranges, each including five successive temperature values. The calculation of the coefficients $x_i$ had to be performed corresponding to each range, which is equivalent to finding the solution of a set of five linear algebraic equations. To determine its solution, we have used the Gauss elimination with backsubstitution. After the calculation of the unknowns $x_i$, by substituting the temperature value in Eq. (5), the value of the equilibrium constant K for any temperature within the respective range can be computed. As soon as K has been determined for a specific dissociation reaction, one can calculate the dissociation fractions by means of the algorithm described above.

Calculus of the Flue Gases Temperature after Dissociation

Since the volume specific heats necessary to write the heat balance equation used to determine the flue gases temperature after dissociation are temperature-dependent, it results a transcendental equation whose unknown is the sought temperature. The Newton-Raphson technique was employed.

The heat balance equation describing the energy conservation in the combustion process is:

$$H_f + H_a = H_{1g}(T_{1g}, V_i(T_{1g})) \quad (5)$$

where:

$H_f$ fuel enthalpy at the preheat temperature $T_{PH}$;

$H_a$ combustion air enthalpy at the preheat temperature $T_{PH}$;

$H_{1g}$ flue gases enthalpy at the temperature $T_{1g}$ after dissociation, as a function of this unknown temperature and of the temperature-dependent flue gases composition $V_i$ volumes of flue gases components as they result after dissociation The fuel enthalpy $H_f$ can be expressed as:

$$H_f = \sum (c_m h_n) \left[ (h_f^0)_{c_m h_n} + \int_{T_0}^{T_{PH}} c_{p, c_m h_n} dT \right] + \quad (6)$$
$$(co2) \left[ (h_f^0)_{CO_2} + \int_{T_0}^{T_{PH}} c_{p,CO_2} dT \right] + (n2) \int_{T_0}^{T_{PH}} c_{p,N_2} dT$$

where $c_m h_n$ denotes a generic gaseous hydrocarbon from the fuel and the parentheses account for the volume fraction of a component in the gaseous mixture.

The equation for the air enthalpy is:

$$H_a = V_a \left[ x_{O_2} \int_{T_0}^{T_{PH}} c_{p,O_2} dT + x_{N_2} \int_{T_0}^{T_{PH}} c_{p,N_2} dT + \quad (7) \right.$$
$$\left. x_{H_2O} \left( (h_f^0)_{H_2O} + \int_{T_0}^{T_{PH}} c_{p,H_2O} dT \right) \right]$$

where x represents the volume fraction of a component in the combustion air.

$H_{1g}$ can be written as:

$$H_{1g} = \sum V_i \left[ (h_f^0)_i + \int_{T_0}^{T_{1g}} c_{p,i} dT \right] + N_2 \int_{T_0}^{T_{1g}} c_{p,N_2} dT + \quad (8)$$
$$V_{O_2} \int_{T_0}^{T_{1g}} c_{p,O_2} dT + V_{H_2} \int_{T_0}^{T_{1g}} c_{p,H_2} dT$$

3.2. The Heat Transfer Surfaces Calculus

The general equations used in the calculation of the heat transfer surface areas are related to the external heat transfer surface area of the pipes. These equations allow the estimation of the external heat transfer surface area and its mean temperature. In order to solve these equations we calculated (or assumed if necessary) the following:

the mean velocities of flows;

the mean path length of radiation through the flue gases volume;

the thermal conductivity of the pipe material;

the outer and inner diameters of the pipes and their geometrical arrangement within the bank;

the parameters of fluids at the mean temperature.

The results of the calculus are summarized in Table 7.

3.2.1. Mean Velocities of Flows

A. The Water-vapor Path

The mean velocities were calculated on the basis of the pressure drops, by using the Darcy-Weissbach relation.

B. The Flue Gases Channel

Usually, for a forced flow (artificial draught) of flue gases, the mean velocities related to the minimum flow section area are in the range (7÷15) m/s. A mean velocity of the flue gases through the economizer of about 10 m/s was imposed. By means of the mass continuity principle and of the ideal gas model, we determined the mean velocities through the F, RH, and S.

3.2.2. Mean Path Length of Flue Gases Radiation

The mean beam path lengths were estimated on the basis of the relation:

$$L_r \cong 0.85 \cdot \frac{4 \cdot V}{S_W} \quad [m] \quad (9)$$

where:

V [m³] is the volume for the radiation heat transfer; $S_W$ [m²] is the heat transfer surface area.

By making some assumptions on the geometry of the heat transfer volumes and surfaces, the mean path lengths have been approximated as follows:

for the furnace volume: $L_T^{furnace}$=10 meters, taking into account the fact that only a fraction of the entire interior surface of the furnace volume is covered by the heat transfer surface consisting of pipe rows. Usually, between the furnace volume and the downward flow channel there is a connection section and moreover, on the vertical walls of the furnace there are special "dead"

areas designed for the placement of burners. These surfaces and the V bottom of the furnace cannot be covered by pipe rows.

free radiation volume within RH and S: the equation used to determine the beam path length in the case of the two heat exchangers (assumed to be similar) is:

$$L_r^{RH,S} \cong 3.4 \frac{(2d_e \cdot \frac{\pi}{2}d_e - \frac{\pi}{4}d_e^2)}{\pi d_e} = 0.05 \text{ m} \quad (10)$$

free radiation volume within E: since the geometrical characteristics of a bank of staggered pipes with external spiral fins can be very diversified, we assumed a mean beam path length about 10 times less then that for RH and S, and consequently $L_T^E = 0.005$ meter.

3.2.3. Diameters of Pipes and Thermal Conductivity of the Wall Material

The inner diameters of the pipes were imposed as follows:

For: E, RH, or S: $d_i = 0.015$ m

For F: $d_i = 0.020$ m

The outer diameters were estimated by imposing a maximum tensile stress of the wall material of about 500 daN/cm². Consequently the outer diameters resulted:

For E, RH, or S: $d_e = 0.020$ m

For F: $d_e = 0.027$ m

Generally, the thermal conductivity of a high-grade alloy steel is in the range (30–50) W/(mK) and thus we imposed $k_w = 40$ W/(mK) = 0.04 kW/(mK).

3.2.4. Convection Heat Transfer Coefficients

A. Along the Water-Vapor Path

Since the Reynolds numbers on the water-vapor side are in excess of $10^4$, we calculated the convection heat transfer coefficients with the relation of Sieder & Tate.

B. Along the Flue Gases Channel

The convection coefficients for E, S, and RH have been calculated with the classical correlations. The convection heat transfer coefficient within the furnace is usually in the range (0.005–0.020) kW/m²K. A general relation for its calculation is not available since it strongly depends on the scheme and on the intensity of the forced flow of the flarne-flue gases mixture along the furnace. These aspects of flue gases flow in the furnace rely on the burners' type and on their geometrical arrangement on the furnace walls. Hence, we adopted for the convection heat transfer coefficient the following value: $h_F = 0.015$ [kW/m²K].

Table 7 synthesizes the heat transfer coefficients. Subscript "i" refers to the water-vapor side of the pipe and subscript "e" accounts for the pipe's outer surface.

The scope of the claims that follow is not to be limited by the description of preferred embodiments. Those skilled in the boiler art, after reading this disclosure, will recognize that the inventive methods are useful in a variety of applications.

What is claimed is:

1. A steam generation apparatus dedicated to combustion of a fuel with an oxygen-enriched oxidant, wherein the oxygen concentration of the oxidant may range from just above 21 percent to 100 percent, the apparatus comprising:

a) an oxidant preheater for exchanging heat with a flue gas, the preheater having a geometry, a size and a heat transfer area to take advantage of i) a flue gas flow rate that is lower, and ii) a flue gas temperature that is higher, due to oxidant/fuel combustion, than a comparable power air/fuel combustion boiler base case;

b) means for introducing a fuel and the oxidant into a combustion space within a furnace of the boiler and combusting the fuel in the presence of the oxidant in order to generate the flue gas;

c) the furnace having a radiant heat transfer section with a plurality of radiant heat transfer section tubes, said tubes having reduced heat transfer area compared to the base case; and d) a convection heat transfer section having a plurality of convection heat transfer section tubes positioned so as to afford increased heat transfer between the flue gas and boiler feed water traversing therethrough while using less heat transfer area over the base case of air/fuel combustion.

2. The apparatus of claim 1, wherein the radiant heat transfer section has a plurality of radiant section tubes, and the convection heat transfer section has a plurality of convection section tubes, the radiant heat transfer section tubes and the convection heat transfer section tubes constructed to withstand temperatures from combustion of said fuel and said preheated oxygen-enriched oxidant, each one of the plurality of radiant section tubes connected to one of the plurality of convection section tubes and being traversed therethrough by boiler feedwater.

3. The apparatus of claim 1 including an economizer in the convection section for producing preheated feed water through heat exchange between feed water and said flue gases, the economizer constructed to withstand said flue gases.

4. The apparatus of claim 1 including at least one superheater for producing superheated steam, the superheater connected to at least a portion of the plurality of convection section tubes.

5. The apparatus of claim 1 including at least one steam drum, the steam drum connected to at least a portion of the plurality of convection and radiant section tubes.

TABLE 7

Heat transfer surface areas and pipe wall temperatures (max. error ±5%)

| Heat Exchanger | Heat Rate [kW] | $H_{ic}$ [kW/m² K] | $h_{ec}$ [kW/m² K] | $h_{er}^{(*)}$ [kW/m² K] | $h_{ecr} = h_{ec} + h_{er}$ [kW/m² K] | HTS [m²] | $T_g$ [K] | $T_w$ [K] | $T_{wall}$ [K] |
|---|---|---|---|---|---|---|---|---|---|
| E | 86887 | 14.660 | 0.0290 | 0.001716 | 0.030716 | 15,979 | 736.026 | 558.04 | 559.0 |
| F | 170000 | 19.594 | 0.0150 | 0.065555 | 0.080555 | 1,321 | 2221.036 | 614.67 | 623.5 |
| RH | 205590 | 17.729 | 0.1375 | 0.045600 | 0.183103 | 887.5 | 1966.036 | 683.60 | 700.9 |
| S | 557542 | 23.144 | 0.0965 | 0.006900 | 0.103400 | 10,133 | 1260.785 | 725.41 | 728.6 |

$^{(*)}h_{er}$ is an equivalent heat transfer coefficient that allows the use of Newton's law in the description of radiation heat transfer relations; for E and F, $h_{er}$ has a real meaning, but not for the superheater, for which the radiation heat transfer relation includes 2 terms, one from the furnace and the other from the flowing flue gases within its inner free volume. By using this equivalent heat transfer coefficient, the heat rate becomes: $Q = (h_{ec} + h_{er}) \cdot HTS \cdot (T_{mng} - T_w)$.

6. The apparatus of claim 4 including an attemperator fluidly connected to at least one of the at least one superheaters.

7. The apparatus in accordance with claim 1 wherein the preheater is selected from the group consisting of tubular recuperative type heat exchangers, flat plate recuperative type heat exchangers, and regenerative heat exchangers.

8. The apparatus of claim 1 constructed to operate at supercritical pressure.

9. The apparatus of claim 8 constructed to operate at subcritical pressure.

10. The apparatus of claim 9 wherein water circulation in the apparatus is produced by means selected from the group consisting of gravity circulation, forced circulation, and combinations thereof.

11. The apparatus of claim 4 including a first expansion turbine, the first expansion turbine adapted to accept a first high pressure fluid from the superheater which is expanded to produce a low pressure fluid, and means to route the low pressure fluid to a reheater, the reheater allowing heat exchange between flue gas and said low pressure fluid.

12. The apparatus of claim 1 comprising means for local flue gas recirculation.

13. A method of operating the steam generation apparatus of claim 1 having reduced heat transfer area and increased efficiency for an equivalent air/fuel power production base case, comprising:

a) flowing the oxidant through the oxidant preheater and exchanging heat indirectly with the flue gas exiting the boiler, thus forming a preheated oxidant, the oxidant selected from the group consisting of oxygen-enriched air and oxygen;

b) introducing the fuel and the preheated oxidant into the furnace of the boiler and combusting the fuel with the preheated oxidant to generate the flue gas and thermal energy, the flue gas having a flow rate that is reduced compared to the base case; and c) feeding the boiler with boiler feed water and circulating the water through the plurality of convection heat transfer section tubes and the purality of radiant heat transfer section tubes, in order to preheat and evaporate the water, and produce superheated steam by heat transfer between the flue gas and the boiler feed water.

14. The method of claim 13, wherein said oxygen-enriched oxidant has an oxygen concentration of at least 90%.

15. The method of claim 13, wherein said fuel is coal.

16. The method of claim 13, wherein a cost of emission control technologies to control release of species comprising those selected from the group consisting of CO2, NOx, SOx, particulate matter, and combinations thereof, is reduced due to the reduced flue gas flow rate and to a more concentrated form of said flue gas.

17. The method of claim 13 comprising flowing the flue gases through means for emission control after traversing the oxidant preheater.

18. The method of claim 13 comprising flowing a portion of the flue gases through means for flue gas recirculation prior to traversing the oxidant preheater.

19. The method of claim 13 comprising flowing a portion of the flue gases through means for flue gas recirculation after traversing the oxidant preheater.

20. The method of claim 15 comprising pulverizing said coal prior to said introducing step.

* * * * *